US011893488B2

(12) United States Patent
Wood et al.

(10) Patent No.: US 11,893,488 B2
(45) Date of Patent: *Feb. 6, 2024

(54) CONTINUOUSLY LEARNING AND OPTIMIZING ARTIFICIAL INTELLIGENCE (AI) ADAPTIVE NEURAL NETWORK (ANN) COMPUTER MODELING METHODS AND SYSTEMS

(71) Applicant: LARSX, Billings, MT (US)

(72) Inventors: Laurence F. Wood, Hamilton, MT (US); Lisa S. Wood, Hamilton, MT (US)

(73) Assignee: LARSX, Billings, MT (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/493,599

(22) Filed: Oct. 4, 2021

(65) Prior Publication Data

US 2022/0101136 A1    Mar. 31, 2022

Related U.S. Application Data

(63) Continuation-in-part of application No. 16/496,302, filed as application No. PCT/US2018/023726 on Mar. 22, 2018, now Pat. No. 11,138,503.

(60) Provisional application No. 62/474,888, filed on Mar. 22, 2017.

(51) Int. Cl.
*G06N 3/08* (2023.01)

(52) U.S. Cl.
CPC ...................... *G06N 3/08* (2013.01)

(58) Field of Classification Search
CPC ............. G06N 3/08; G06N 3/065; G06N 3/04
See application file for complete search history.

(56) References Cited

U.S. PATENT DOCUMENTS

| 5,835,901 | A  | 11/1998 | Duvoisin, III et al. |
| 6,169,981 | B1 | 1/2001  | Werbos |
| 6,604,091 | B2 | 8/2003  | Sadakuni |
| 6,665,651 | B2 | 12/2003 | Young et al. |
| 6,957,113 | B1 | 10/2005 | Logsdon et al. |

(Continued)

FOREIGN PATENT DOCUMENTS

WO    WO-2018175698 A1 *  9/2018  .............. G06F 3/011

OTHER PUBLICATIONS

Author Unknown, "Monolithic Microwave Integrated Circuit", Wikipedia, Version Published Online Jun. 22, 2021 (Year: 2021).*

(Continued)

*Primary Examiner* — Aaron W Carter
(74) *Attorney, Agent, or Firm* — Peter B. Scull

(57) ABSTRACT

Provided are continuously learning and optimizing artificial intelligence (AI) adaptive neural network (ANN) computer modeling methods and systems, designated "human affect computer modeling" (HACM) or "affective neuron" (AN) and, more particularly, to AI methods, systems and devices, that can recognize, interpret, process and simulate human reactions and affects such as emotional responses to internal and external sensory stimuli, that provides real-time reinforcement learning modeling that reproduces human affects and/or reactions, wherein the human affect computer modeling (HACM) can be used singularly or collectively for modeling and predicting complex human reactions and affects.

11 Claims, 13 Drawing Sheets

(56) References Cited

U.S. PATENT DOCUMENTS

| | | | |
|---|---|---|---|
| 7,080,055 B2 | 7/2006 | Campos et al. | |
| 7,849,033 B2 | 12/2010 | Sabe et al. | |
| 8,762,305 B1* | 6/2014 | Chelian | G06N 3/008 |
| | | | 706/14 |
| 9,129,158 B1* | 9/2015 | Medasani | G06V 40/20 |
| 9,256,215 B2 | 2/2016 | Sinyavskiy et al. | |
| 9,600,767 B1* | 3/2017 | Nogin | G06N 5/04 |
| 10,835,147 B1* | 11/2020 | Parra | A61B 5/0205 |
| 11,138,503 B2* | 10/2021 | Wood | G06N 3/08 |
| 2002/0069235 A1 | 6/2002 | Chen | |
| 2003/0160322 A1* | 8/2003 | Hsieh | H01L 23/3677 |
| | | | 257/E23.105 |
| 2004/0002803 A1* | 1/2004 | Lee | F16H 61/0213 |
| | | | 701/59 |
| 2008/0091628 A1 | 4/2008 | Srinivasa et al. | |
| 2010/0009325 A1* | 1/2010 | Afanasiev | G09B 19/00 |
| | | | 434/236 |
| 2010/0114807 A1 | 5/2010 | Ueda et al. | |
| 2013/0262349 A1* | 10/2013 | Bouqata | G06N 20/10 |
| | | | 706/12 |
| 2014/0067740 A1* | 3/2014 | Solari | G06N 3/10 |
| | | | 706/27 |
| 2014/0156577 A1 | 6/2014 | Eliasmith et al. | |
| 2015/0052092 A1 | 2/2015 | Tang et al. | |
| 2015/0106314 A1 | 4/2015 | Birdwell et al. | |
| 2015/0339570 A1* | 11/2015 | Scheffler | G06N 3/04 |
| | | | 706/27 |
| 2017/0258390 A1* | 9/2017 | Howard | A61B 5/369 |
| 2019/0247662 A1* | 8/2019 | Poltroak | A61B 5/0816 |
| 2020/0008725 A1* | 1/2020 | Bach | A61B 5/369 |
| 2020/0060566 A1* | 2/2020 | Howard | A61B 5/7253 |
| 2020/0097808 A1* | 3/2020 | Thomas | G06Q 10/063 |
| 2020/0317220 A1* | 10/2020 | Kameda | B60W 60/001 |
| 2020/0356849 A1* | 11/2020 | Xu | G06N 3/08 |
| 2021/0034959 A1* | 2/2021 | Wood | G06N 3/0409 |
| 2022/0101136 A1* | 3/2022 | Wood | G06N 3/08 |
| 2022/0284288 A1* | 9/2022 | Tolias | G06N 3/08 |

OTHER PUBLICATIONS

Gil et al., "Theoretical and Experimental Study of the InP/InGaAs PIN Diode for Millimeter-wave MMIC Applications", IEEE, May 2007 (Year: 2007).*

Das et al., "Microwave Integrated Circuits", Wiley Online Library, Apr. 2005 (Year: 2005).*

International Preliminary Report on Patentability by the International Bureau and Written Opinion. International Application No. PCT/US2018/023726 issued by the European Patent Office, dated Sep. 24, 2019, 12 pages, Geneva, Switzerland.

* cited by examiner 516 518

| Function | Anatomical Structure/Pathways in Fig. 3 |
|---|---|
| 1. Memory | V4<—>TC, TC<—>HS, NC<—>HS, HS<—>PFC, {MT+V4}<—>PC, PLC<—>PFC, PC<—>MC, {CBL,SC}<—>MC |
| 2. Learning | V4<—>TC, TC<—>HS, NC<—>HS, HS<—>PFC, {MT+V4}<—>PC, PLC<—>PFC, PC<—>MC, {CBL,SC}<—>MC, PLC<—>THAL |
| 3. Executive processes | HS<—>TC, HS<—>PFC, PLC ->BG, PLC<—>PFC, PFC<—>BG, PC<—>PFC, PC ->MC, MC ->BG, BG<—> {CBL, SC} |
| 4. Language/ Symbolic Communication | NC<—>TC, NC<—>PC, HS<—>TC, PC<—>PFC |
| 5. Social/ Emotional | AM ->BG {HT,CC} -> BG |
| 6. Consciousness | TC<—>PFC, HS<—>PFC, PFC<—>BG, PLC<—>PFC, PC<—>PFC |
| 7. Knowledge Representation | TC, NC, PFC, PC |
| 8. Logic/ Reasoning | PFC<—>BG, NC<—>TC, NC<—>PC |
| 9. Elementary Vision | Vision —> THAL<—>VC |
| 10. Higher Vision – Object perception | THAL<—>VC, VC<—>TC, TC<—>PFC |
| 11. Higher Vision – Spatial perception | THAL<—>VC, VC<—>PC, PC<—>PFC |
| 12. Audition | Audio—> THAL<—>AC, AC<—>TC, AC<—>PC, TC<—>PFC |
| 13. Proprioception | NC—>MC, MC->{CBL,SC}, CBL<—>Motors |
| 14. Vestibular Function | CBL<—>Motors |
| 15. Polysensory integration | PC<—>MC, PC<—>PFC |
| 16. Spatial Cognition | HS<—>TC, HS<—>PFC, PC<—>PFC, TC<—>PFC, PC<—>MC |
| 17. Attentional Mechanisms | HS <—>TC, NC<—>TC, PLC<—>PFC, HS<—>PFC, PFC<—>BG, AM<—>BG, {HT,CC} <—>BG |
| 18. Motivation | HT, AM, CC |

FIG. 5B

FIG. 7a  Forward Bias
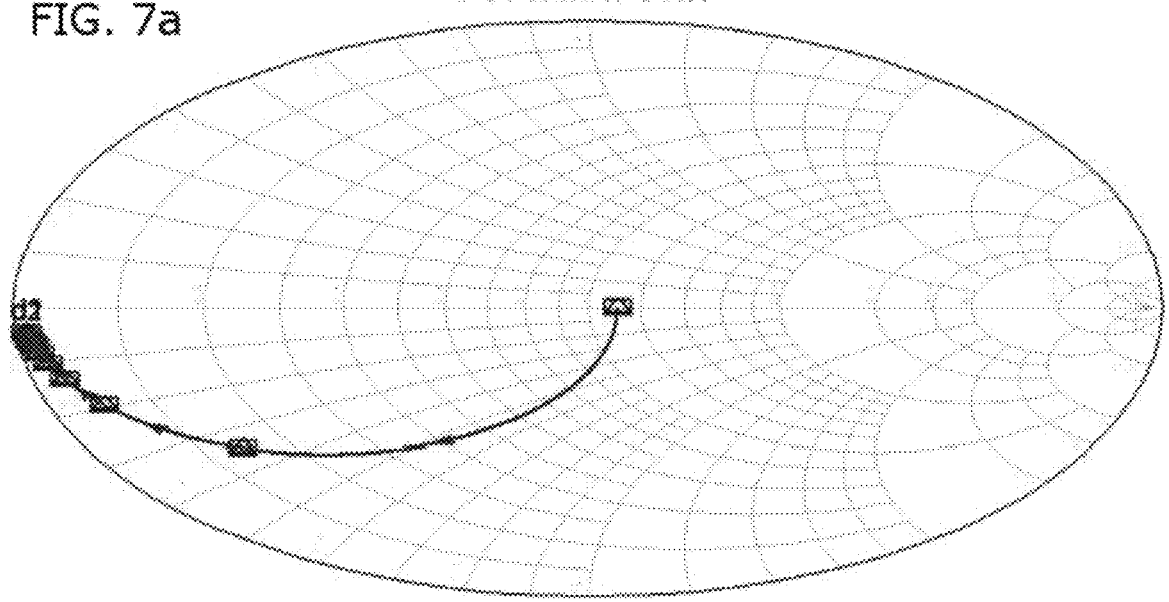
FIG. 7b  Rearward Bias
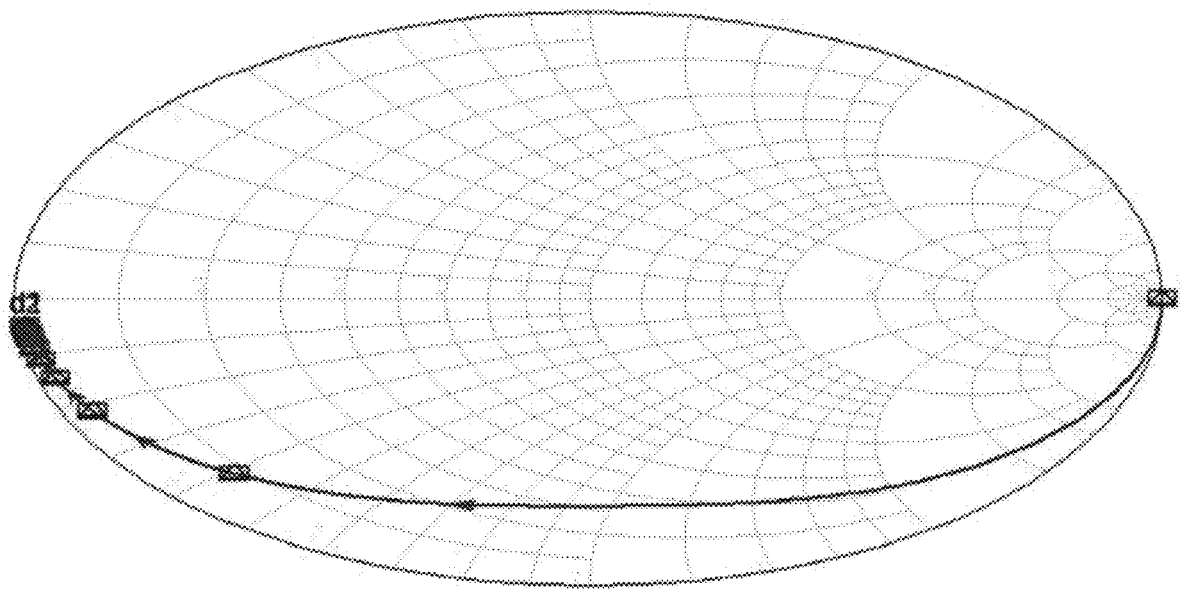

PORT
P=1
Z=50 Ohm

DIODE
ID=D1
Nu=1.17
T=21.85 DegC
Io=255e-3 / 1e9 mA
R=3.6 Ohm
C=33.21e-3 pF

PORT
P=2
Z=50 Ohm

US 11,893,488 B2

CONTINUOUSLY LEARNING AND OPTIMIZING ARTIFICIAL INTELLIGENCE (AI) ADAPTIVE NEURAL NETWORK (ANN) COMPUTER MODELING METHODS AND SYSTEMS

FIELD OF INVENTION

The present invention relates to continuously learning and optimizing artificial intelligence (AI) adaptive neural network (ANN) computer modeling methods and systems, designated "human affect computer modeling" (HACM) or "affective neuron" (AN) and, more particularly, to AI methods, systems and devices that can recognize, interpret, process and simulate human reactions and affects such as emotional responses to internal and external sensory stimuli, that provides real-time reinforcement learning modeling that reproduces human affects and/or reactions. The human affect computer modeling (HACM) can be used singularly or collectively for modeling and predicting complex human reactions and affects.

BACKGROUND OF INVENTION

Artificial Intelligence (AI) is a branch of computer science that deals with intelligent behavior, learning, and adaptation in machines. Research in AI is traditionally concerned with producing machines to automate tasks requiring intelligent behavior. While many researchers have attempted to create AI systems, there is very limited prior work on comprehensive cognitive architectures.

For example, there is no comprehensive brain-like architecture that links physiology with anatomy and the derived functionalities. However, numerous neuroscience-inspired modal architectures have been proposed. Functional characterizations of these architectures typically use aspects from very different levels of biologically-inspired descriptions.

A description of psychology-based architectures is provided since these represent the state of the art in cognitive architectures. While several cognitive architectures have been proposed and implemented, two popular and commonly used architectures are ACT-R, and Soar. ACT-R is a parallel-matching, serial-firing production system with a psychologically motivated conflict resolution strategy. Soar is a parallel-matching, parallel-firing rule-based system where the rules represent both procedural and declarative knowledge.

Modeling: It is not clear if the human cognitive processes can be comprehensively modeled as a production system. Even if the processes were, the production system would lack the capability of modeling flexible behavior. For example, ACT-R instantiates only rules that match the current goal and these have complete control of problem solving, including when to surrender control. Hence ACT-R cannot respond to dynamic internal or external changes.

Representation and self organization: Prior models use rigid propositional representations and share an inviolable structural constraint. Comprehensiveness: Traditional cognitive architectures are not comprehensive. Such architectures lack detailed theories of speech perception or production as well as mechanisms for perceptual recognition, mental imagery, emotion, and motivation.

Integration of perception and problem solving: Typically, perception is peripheral activity that is treated separately from problem solving in traditional cognitive architectures. An overall comprehensive architecture must be integrative of these. For example, the architecture must address how perception is related to representation change in problem-solving and how linguistic structures may affect problem-solving. AN or HACM explores the integration of perception, problem solving and natural language at a deeper level.

Implementation: ACT-R has neither been used to reason about concurrent actions nor in hierarchy. It is difficult, although not impossible, to implement a hierarchy of behaviors in Soar. Therefore, a need exists for a more flexible arrangement of goals that permits multiple abstract behaviors that can share implementations.

Implementing such a complex system of neural-like components is a major challenge. Additional work on motifs in brain networks is a mathematical optimization technique to obtain network topologies that resemble brain networks across a spectrum of structural measures. Further, it has been suggested building brain-like computers via software development using models at a level between low-level network of attractor networks and associatively linked networks. However, it is not clear how the above are neuromorphic architectures or that they support the large body of neuroscience data.

Research in neuroscience and cognitive psychology over the last several decades has made remarkable progress in unraveling the mysteries of the human mind. However, it is still quite far from building and integrating computational models of the entire gamut of human-like cognitive capabilities, where little has been developed in the way of building an integrated and comprehensive architecture.

A challenge present in the art is to develop a cognitive architecture that is comprehensive and covers the full range of human cognition. Current approaches are not able to provide such a comprehensive architecture. Architectures developed to-date typically solve single and multiple modal problems that are highly specialized in function and design. In addition, there are often very different underlying theories and architectures for the same cognitive modal problem. This presents a significant challenge in seamlessly integrating these disparate theories into a comprehensive architecture such that all cognitive functionalities can be addressed. Computational design and implementation of these architectures is another major challenge. These architectures must be amenable to implementation as stand-alone or hybrid neuro-AI architectures via software/hardware and evaluation in follow-on phases.

Thus, a continuing need exists for an architecture that seamlessly integrates models firmly rooted in neural principles, mechanisms, and computations for which there is supporting neuro-physiological data and which link to human behaviors based an a large body of psychophysical data.

SUMMARY OF INVENTION

The present invention relates to an artificial intelligence (AI) learning system using adaptive neural networks (ANN) designated "human affect computer modeling" (HACM) or "affective neuron" (AN) and, more particularly, to AI methods, systems and devices that can recognize, interpret, process, and simulate human reactions and affects such as emotional responses to internal and external sensory stimuli, that provides real-time reinforcement learning modeling that reproduces and predicts human affects and/or reactions. The human affect computer modeling; (HACM) or Affective Neuron (AN) can be used singularly or collectively to modeling and predict complex human reactions and affects. Such AI ANN learning systems can optionally comprise a sensory input collection module, a cognitive learning module, and an execution module. The sensory input collection module is operative to receive and process an external sensory input from at least one external environment and at least one internal environment and collect and record data representing the sensory input data as representing velocity and acceleration vectors corresponding to sensory input-specific features from the external sensory input. The cognitive learning module is operative to receive the sensory input data as representing velocity and acceleration vectors corresponding to sensory input-specific features and identify a current context AI ANN model based on the sensory input-specific features, and, based on the current context AI ANN model and features, learn, construct, or recall a set of action plans and evaluate the set of action plans against any previously known action plans in a related context and, based on the evaluation, selecting the most appropriate action plan given the current context. The execution module is operative to carry out the action plan.

Cerebellar model articulation controller (CMAC) is a type of neural network based on a modeling the parallel processing capabilities of the mammalian cerebellum. CMAC was first proposed as a function modeler for robotic controllers by Albus in 1975 and has been used in reinforcement learning and also as for automated classification in the machine learning community. CMAC computes a function $f(x1, \ldots xn)$, where n is the number of input dimensions. The input space is divided up into hyper-rectangles, each of which is associated with a memory cell. The contents of the memory cells are the weights, which are adjusted during training. Usually, more than one quantization of the input space is used, so that any point in an input space is associated with a number of hyper-rectangles, and therefore with a number of memory cells. The output of a CMAC is the algebraic sum of the weights in all the memory cells activated by the input point. A change of value of the input point results in a change in the set of activated hyper-rectangles and therefore a change in the set of memory cells participating in the CMAC output. The CMAC output is therefore stored in a distributed fashion, such that output corresponding to any point in input space is derived from the value stored in a number of memory cells (hence the name associative memory), which provides generalization. The CMAC is an example of an ANN learning module that is a component to the AN. Other ANN learning modules may be substituted instead of the CMAC as required or desired.

The track that the position locator traverses may be one to n dimensions. Subject to the ANN module continuous learning process, the position locator traverses the track subject to different forces of resistance and acceleration (such as gravity or other arbitrary forces, for example). Subject to one or a plurality of real number inputs normalized to be between 0 and 1, the ANN changes the locator position on the track varying velocity (first derivative) and acceleration (second derivative) to achieve the coordinates on the track required to meet the ANN objective function (inputs) in the shortest number of training steps. Affective or reactionary (e.g., emotional) results are recovered by metrics that describe the ease or difficulty associated with the ANN learning the required locator position on the track.

These metrics minimally include 1) the locator position prediction coordinates, 2) locator position velocity, 3) locator position acceleration, 4) the number of steps required for an human affect computer modeling (HACM) module to achieve the desired locator position coordinates on the track, 5) an error metric describing the efficiency of the AN OR HACM module moving the locator to the desired position on the track and 6) a return value describing the overall all prediction success rate. The AN OR HACM signal outputs reflect the input values exactly so that, for example, the number 0.5 presented to the AN OR HACM will be reflected as the output of the AN OR HACM once the training period is completed. Consequently, the value of the AN OR HACM is not to generalize as is the case with current ANN technologies, it is the AN OR HACM Metric outputs that are important. The track of the AN OR HACM can have different configurations, for example, instead of a straight track, the track may be curved or have a sinusoidal structure as in a bell curve. Using different track configurations skews the AN OR HACM outputs by integrating bias into the HACM learning process. This might be desirable when resistance to change is desired.

Unlike in all other affective technologies, each AN OR HACM is a highly compact and efficient individual artificial neuron. The number of ANs OR HACMs can be in the millions, which enables highly complex emotional responses and interactions. Each AN OR HACM has the capacity to have complex emotional responses. The following sets of results demonstrate an experiment where a single AN OR HACM was trained to induce a Posttraumatic Stress Disorder (PTSD) response to environmental stimuli. A non-PTSD AN or HACM control is shown below the PTSD training example. This was followed by an example where an individual HACM was trained to be vigilant to infinitely repeating floating point numbers out to sixteen decimal places As a non-limiting example, PTSD is a disorder that can develop after a person is exposed to a traumatic event. Here the AN or HACM traumatic event is erratic training. In the second experiment the AN or HACM was trained to be vigilant. The first plot is the PTSD training where the AN or HACM is exposed to random inputs. The second plot shows the PTSD response to the same HACM even though it is being exposed to consistent inputs. The third frame is a control that shows a different AN or HACM being exposed to consistent inputs. The final plot is an AN or HACM trained to vigilance with respect to a stimulus.

A single AN or HACM is trained to random inconsistent inputs. Notice the number of steps (4) required for the AN or HACM to respond to the random input becomes progressively more erratic. This indicates a stressful physiological response to forcing the AN or HACM to learn an erratic stimulus that it cannot predict over time. Notice the error metric (5) progressively increases over time indicating the quantitative equivalent of chronic anxiety.

When the AN or HACM is exposed to erratic stimuli to a consistent signal, the number of steps (4) required for the AN or HACM to respond to the consistent signal immediately reflects the stress associated with the prior erratic training, even though the input signal is consistently set to 0.5. Although the physiological stress response stabilizes, it is permanently affective by the early erratic training, indicating a PTSD like response. Also, the training error metric is also heightened even though the training stimuli is stable. This indicates an AN or HACM PTSD chronic anxiety response being modeled, which only very slowly reduces over time but does not vanish. This demonstration of a single AN or HACM shows how the modeling can be trained to reflect PTSD like behavior, where the AN or HACM is hyper vigilant to a possibility of further erratic training.

As a control a AN or HACM that has not been exposed to erratic training, where it first detected the presence of a consistent stimuli and then stabilizes to nominal training stress. There is no error associated with this training response as can be seen by a flat Chronic Anxiety plot When a different AN or HACM is trained to provide an immediate response to an infinitely repeating floating point number representation of 16 decimal points, although the floating point number is consistent, the variability in the machine hardware representation is detected by the HACM and it becomes vigilant to detecting minor changes to the floating point number representation out to 16 digits. This is much different than the PTSD training scenario as presented above.

According to optional embodiments of the invention, a continuously learning and optimizing artificial intelligence (AI) adaptive neural network (ANN) computer modeling method is provided, designated "human affective computer modeling" (HACM), for predicting, modeling, and/or simulating human reactions to repeated human stress and/or affect responses to sensory inputs from both external and internal environmental stimuli, the method using learning control and multiple parallel processing neural network pathways, and not using pattern recognition, the AI ANN modeling method comprising:

(a) executing at least one sensory input collection module on at least one computer system using non-transitory computer readable media operative to collect sensory input data representing at least one set of external environment stimuli inputs and at least one set of internal environmental stimuli inputs from at least one internal environment and at least one external environment;

(b) executing at least one recording module on at least one computer system using non-transitory computer readable media operative for recording the sensory input data, wherein the sensory input data corresponds to at least two sensory input-specific features;

(c) executing at least one context module on at least one computer system using non-transitory computer readable media operative to identify and generate at least one current context AI ANN model that processes said sensory input data to provide human reaction model data that is configured for use in a human reaction modeling module that predicts, simulates and models said simulated human reactions to said repeated human stress and/or affect responses to said sensory inputs from said both external and internal environmental stimuli;

(d) executing, at least one vector generating module on at least one computer system using non-transitory computer readable media operative to process the human reaction model data to generate position locator and track data comprising velocity vectors and acceleration vectors that determine at least one position locator on at least one corresponding position locator track traversing at least one dimension, wherein said position locator and track data correspond to said human reaction model data;

(e) executing at least one human reaction modeling module on at least one computer system using non-transitory computer readable media, the human reaction modeling module operative to use said position locator and track data that is continuously updated to generate human reaction model data that predicts, simulates and/or models said simulated human reactions to said repeated human stress and/or affect responses to said sensory inputs from said both external and internal environmental stimuli;

(f) executing at least one cognitive learning module on at least one computer system using non-transitory computer readable media operative to:

(i) compare said predictive reaction/behavior data, corresponding to said predicted, simulated and/or modeled simulated human reactions, with corresponding measured reaction/behavior data from measured or recorded stress and/or affect parameter data of comparative human subjects in similar internal and/or external environments and current contexts; and (ii) generate continuously updated predictive reaction/behavior data from said human reaction model data and from said measured reaction/behavior data, wherein said at least one cognitive learning module predicts, simulates and models said simulated human reactions to said repeated human stress and/or affect responses using said position locator and track data and said measured reaction/behavior data; and (g) executing at least one optimizing module on at least one computer system using non-transitory computer readable media operative to generate optimized predictive reaction/behavior data using first and second derivative optimization of said position locator and track data with learning control and multiple parallel processing neural network pathways to determine optimized sets of said velocity vectors and acceleration vectors corresponding to optimized position locator and track data that provide said optimized predictive reaction/behavior data with the highest correspondence to said measured reaction/behavior data and/or data extrapolated therefrom.

The cognitive learning module optionally further comprises an object and event learning system and a novelty detection, search, and navigation module. The object and event learning system optionally is operative to use the sensory input data as representing velocity and acceleration vectors corresponding to sensory input-specific features to classify the features as objects and events. Additionally, the novelty detection, search, and navigation module is optionally operative to determine if the sensory input data as representing velocity and acceleration vectors corresponding to sensory input-specific features match previously known events and objects. If they do not match, then the object and event learning system optionally stores the features as new objects and events. Alternatively, if they do match, then the object and event learning system optionally stores the features as updated features corresponding to known objects and events.

In another optional aspect, the cognitive learning module further comprises a spatial representation module. The spatial representation module is operative to establish space and time attributes for the objects and events. The spatial representation module is also operative to transmit the space and time attributes to the novelty detection, search, and navigation module, with the novelty detection, search, and navigation module being operative to use the space and time attributes to construct a spatial map of the external world.

In yet another optional aspect, the cognitive learning module further comprises an internal valuation module to evaluate a value of the sensory input data as representing velocity and acceleration vectors corresponding to sensory input-specific features and the current context. The internal valuation module is operative to generate a status of internal states of the system and given the current context, associate the sensory input data as representing velocity and acceleration vectors corresponding to sensory input-specific features to the internal states as improving or degrading the internal state.

Additionally, the cognitive learning module optionally further comprises an external valuation module. The external valuation module is operative to establish an action value based purely on the objects and events. The action value is positively correlated with action plans that are rewarding to the system based on any previously known action plans. The external valuation module is also operative to learn from the positive correlation to assess the value of future action plans and scale a speed at which the action plans are executed by the execution module.

In another optional aspect, the cognitive learning module further comprises a behavior planner module that is operative to receive information about the objects and events, the space and time attributes for the objects and events, and the spatial map to learn, construct, or recall a set of action plans, and use the status of the internal state to sub-select the most appropriate action from the set of action plans. The external valuation module is also operative to open a gate in a manner proportional to the action value such that selected or action plans that exceed a predetermined action value level proceed to the execution module.

In yet another optional aspect, the execution module is operative to receive the action plans and order them in a queue sequentially according to their action value; receive inputs to determine the speed at which to execute each action plan; sequentially execute the action plans according to the order of the queue and the determined speed; and learn the timing of the sequential execution for any given action plan in order to increase efficiency when executing similar action plans in the future.

Additionally, the sensory input collection module optionally includes a sensor for sensing and generating the external sensory inputs. The sensor is selected from a group consisting of a somatic sensor, an auditory sensor, and a visual sensor.

The present invention also optionally comprises a computer program product and method. The method includes a plurality of acts for carrying out the operations described herein.

The computer program product comprises computer-readable instruction means stored on a computer-readable medium. The instruction means are executable by a computer for causing the computer to perform the described operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5B is a table mapping various cognitive functionalities with structures and pathways as related to the architecture of the present invention.

FIG. 7*a*-7*d* are graphical and schematic representations of alternative semiconductor implementations of the AN using MMICs, which implement the locator track, locator, the locator movement, and the metric outputs shown in FIG. 7. High operational frequencies up and beyond 3000 Gigahertz are provided using a InGaAs diode (FIG. 7*d*) as the locator as shown in FIGS. 7*a* and 7*b*. FIG. 7*c* shows the locator moving along the diode voltage versus current curve, with the current as position on locator track (FIG. 7).

DETAILED DESCRIPTION

Figure 1:
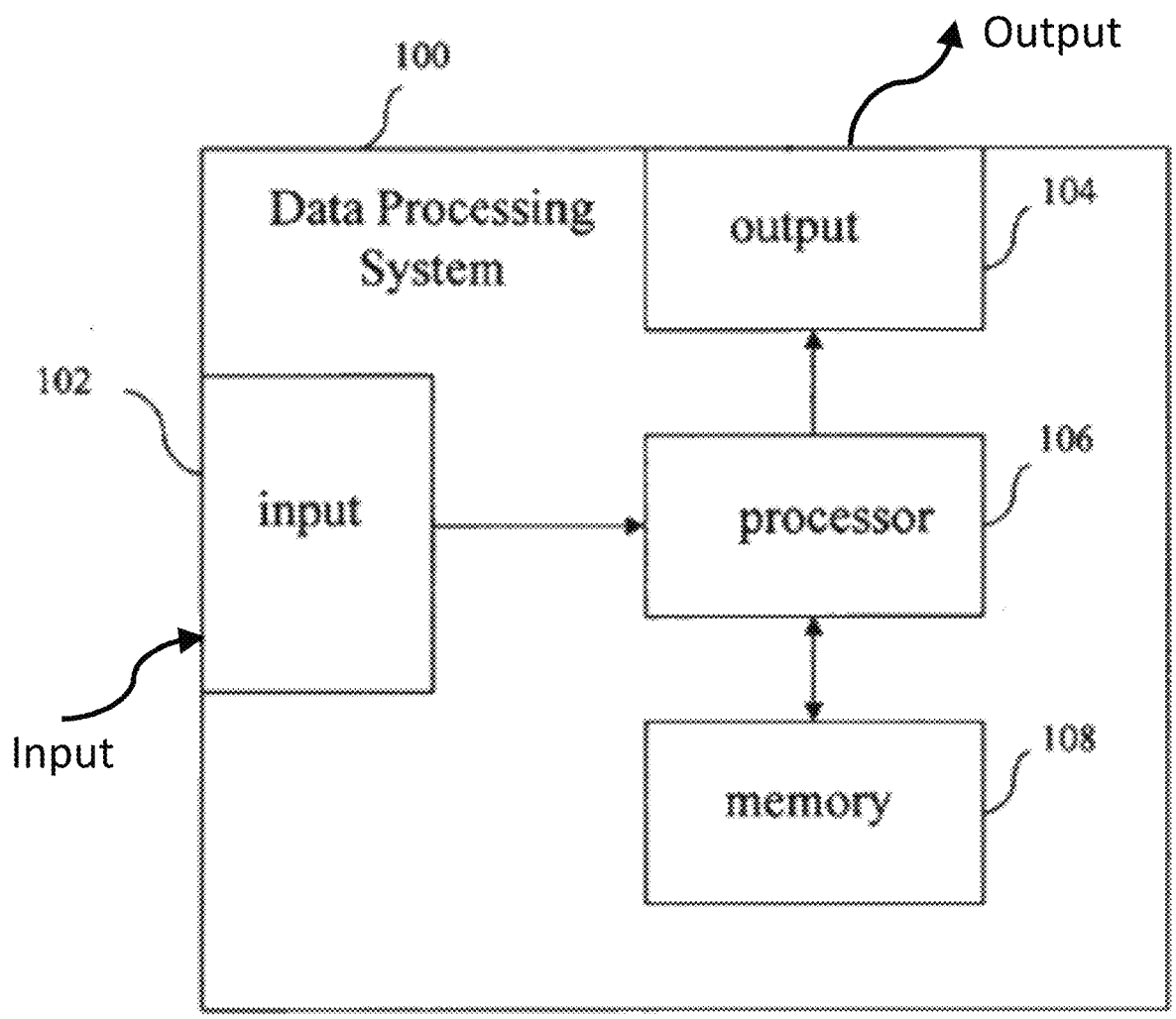
FIG. 1 is a block diagram depicting the components of an artificial intelligence system according to the present invention.

The present invention relates to a continuously learning and optimizing artificial intelligence (AI) adaptive neural network (ANN) computer modeling methods and systems, designated "human affect computer modeling" (HACM) and, more particularly, to AI methods, systems and devices that can recognize, interpret, process and simulate human reactions and affects such as emotional responses to internal and external sensory stimuli, that provides real-time reinforcement learning modeling that reproduces human affects and/or reactions. The human affect computer modeling (HACM) can be used singularly or collectively to modeling and predict complex human reactions and affects.

The human affect computer modeling (HACM) can be used singularly or collectively to modeling and predict complex human reactions and affects, such as emotional responses to internal and/or external stimuli. Such AI ANN learning systems can optionally comprise a sensory input collection module, a cognitive learning module, and an execution module. The sensory input collection module is operative to receive and process an external sensory input from at least one external environment and at least one internal environment and collect and record data representing the sensory input data as representing velocity and acceleration vectors corresponding to sensory input-specific features from the external sensory input. The cognitive learning module is operative to receive the sensory input data as representing velocity and acceleration vectors corresponding to sensory input-specific features and identify a current context AI ANN model based on the sensory input-specific features, and, based on the current context AI ANN model and features, learn, construct, or recall a set of action plans and evaluate the set of action plans against any previously known action plans in a related context and, based on the evaluation, selecting the most appropriate action plan given the current context. The execution module is operative to carry out the action plan.

Cerebellar model articulation controller (CMAC) is a type of neural network based on a modeling the parallel processing capabilities of the mammalian cerebellum. CMAC was first proposed as a function modeler for robotic controllers by Albus in 1975 and has been used in reinforcement learning and also as for automated classification in the machine learning community. CMAC computes a function f(x1, . . . xn), where n is the number of input dimensions.

The input space is divided up into hyper-rectangles, each of which is associated with a memory cell. The contents of the memory cells are the weights, which are adjusted during training. Usually, more than one quantization of the input space is used, so that any point in an input space is associated with a number of hyper-rectangles, and therefore with a number of memory cells. The output of a CMAC is the algebraic sum of the weights in all the memory cells activated by the input point. A change of value of the input point results in a change in the set of activated hyper-rectangles and therefore a change in the set of memory cells participating in the CMAC output. The CMAC output is therefore stored in a distributed fashion, such that output corresponding to any point in input space is derived from the value stored in a number of memory cells (hence the name associative memory), which provides generalization. The CMAC is an example of an ANN learning module that is a component to the AN. Other ANN learning modules may be substituted instead of the CMAC as required or desired.

The track that the position locator traverses may be one to n dimensions. Subject to the ANN module continuous learning process, the position locator traverses the track subject to different forces of resistance and acceleration (such as gravity or other arbitrary forces, for example). Subject to one or a plurality of real number inputs normalized to be between 0 and 1, the ANN changes the locator position on the track varying velocity (first derivative) and acceleration (second derivative) to achieve the coordinates on the track required to meet the ANN objective function (inputs) in the shortest number of training steps. Affective or reactionary (e.g., emotional) results are recovered by metrics that describe the ease or difficulty associated with the ANN learning the required locator position on the track.

These metrics minimally include two or more of (1) the locator position prediction coordinates, (2) locator position velocity, (3) locator position acceleration, (4) the number of steps required for an human affect computer modeling (HACM) module to achieve the desired locator position coordinates on the track, (5) an error metric describing the efficiency of the HACM module moving the locator to the desired position on the track and (6) a return value describing the overall all prediction success rate. The HACM outputs optionally reflect the input values exactly so that, for example, the number 0.5 presented to the HACM will be reflected as the output of the HACM once the training period is completed. Consequently, the value of the HACM is not to generalize as is the case with current ANN technologies, it is the HACM Metric outputs that are optionally important. The track of the HACM can have different configurations, for example, instead of a straight track, the track may be curved or have a sinusoidal structure, e.g., as in a bell curve. Using different track configurations skews the HACM outputs by integrating bias into the HACM learning process. This can optionally used when resistance to change is desired in the modeling.

Unlike in all other affective technologies, each HACM is a highly compact and efficient individual computer modeling artificial neuron. The number of HACMs can be in in the ranges of 1-millions, such as but not limited to, 1-100, 100-1000, 1000-10,000, 10,000-100,000, or 100,000, or 100,000-1,000,000 or more, which enables highly complex reactionary, affective, and/or emotional responses and interactions. Each HACM has the capacity to have complex emotional responses. The following exemplary sets of results demonstrate proof of concept in an experiment where a single HACM was trained to model and induce a Post-traumatic Stress Disorder (PTSD) response to environmental and/or internal stimuli. A non-PTSD HACM control was used and compared to where an individual HACM was trained to be vigilant to infinitely repeating floating point numbers out to sixteen decimal places.

The following description is presented to enable one of ordinary skill in the art to make and use the invention and to incorporate it in the context of particular applications. Various modifications, as well as a variety of uses in different applications will be clear to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, to avoid obscuring the present invention.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Exemplary and Non-Limiting Terms

Adaptive Resonance Theory (ART) is used for stable construction of declarative and procedural memory within the sensory and cognitive processes based on "winner-take-all" and distributed computational mechanisms. Stable learning implies that the system can retain (not forget) large amounts of knowledge.

Adaptive Timing Circuits refers to the interactions between the sensory and cognitive processes with spatial and motor processes via adaptive timing circuits to enable stable construction of action plans that lead to cognitive behaviors. The adaptively timed circuits can function at both micro and macro time scales, thereby providing the ability to enact a wide range of plans and actions for a continuously changing environment.

Complementary Computing refers to complementary pairs of parallel processing streams, wherein each stream's properties are related to those of a complementary stream (e.g., the "What" and "Where" streams). Complementary computing is needed to compute complete information to solve a given modal problem (e.g., vision, audition, sensory-motor control). Hierarchical and parallel interactions between the streams can resolve complementary deficiencies.

Instruction Means generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Laminar Computing refers to a unified laminar format for the neural circuits that is prevalent in the various regions of the cerebral cortex. It is organized into layered circuits (usually six main layers) that undergo characteristic bottom-up, top-down, and horizontal interactions. Its ubiquity means that the basic function of the cortex is independent of the nature of the data that it is processing. Specializations of interactions in different modalities realize different combinations of properties, which points to the possibility of developing Very Large-Scale Integration (VLSI) systems.

Linking Affordances and Actions refers to collect and record data representing general brain operating principles (BOPs) from studies of visual control of eye movements and hand movements, and the linkage of imitation and language. It also refers to the integration of parietal "affordances" (perceptual representation of possibilities for action) and frontal "motor schemas" (coordinated control programs for action) and subsequent interactions.

Spatio-Temporal Pattern Learning refers to working memory models such as STORE and TOTEM for stable construction of temporal chunks or events that will be used to construct plans and episodic memory. STORE refers to a Sustained Temporal Order Recurrent network, as known in the art. TOTEM refers to a Topological and Temporal Correlator network, as known in the art. Temporal chunking allows multimodal information fusion capability. This is used for storage of event information and construction of stable action plans.

Topographic Organization refers to organizations that are observed in both the sensory (e.g., retina, cochlea) and motor cortex, where world events that are neighbors (in some sense) are also represented in neighboring patches of the cortex. The topographic organization has strong implications for the details of connectivity within given brain areas as it emphasizes local connectivity over long-range connectivity Acronyms The present invention optionally uses one or more of several analogies to anatomical structures and pathways, which are abbreviated, e.g., as follows: THAL=Thalamus; SC=Somatosensory Cortex; AC=Auditory Cortex; VC=Visual Cortex; NC=Neocortex; MC=Motor Cortex; TC=Temporal Cortex; PC=Parietal Cortex; PFC=Prefrontal Cortex; HS=Hippocampal System; HT=Hypothalamus; CC=Cingulate Cortex; PLC=Prelimbic Cortex; AM=Amygdala; BG=Basal Ganglia; CBL=Cerebellum; and SCL=Superior Colliculus.

The present invention optionally comprises three principal aspects. The first is a learning system. The learning system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium, such as, but not limited, a holographic storage device, an optical storage device, e.g., a compact disc (CD) or digital versatile disc (DVD), or a magnetic or solid state storage device such as a magnetic or solid state hard drive, USB drive, and the like. Other, non-limiting examples of computer-readable non-transitory media include other types of hard disks, read-only memory (ROM), and flash-type memories. These aspects will be described by way of non-limiting examples, as presented in more detail below.

A block diagram depicting the components of the learning system of the present invention is provided in FIG. 1. The learning system 100 comprises an input 102 for receiving information from at least one sensor for use in detecting an object and/or event. Note that the input 102 may include multiple "ports." Typically, input is received from at least one sensor, non-limiting examples of which include video image sensors. An output 104 relates to the processor for providing action information or other information regarding the presence and/or identity of object(s) in the scene to other systems in order that a network of computer systems may serve as a learning system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
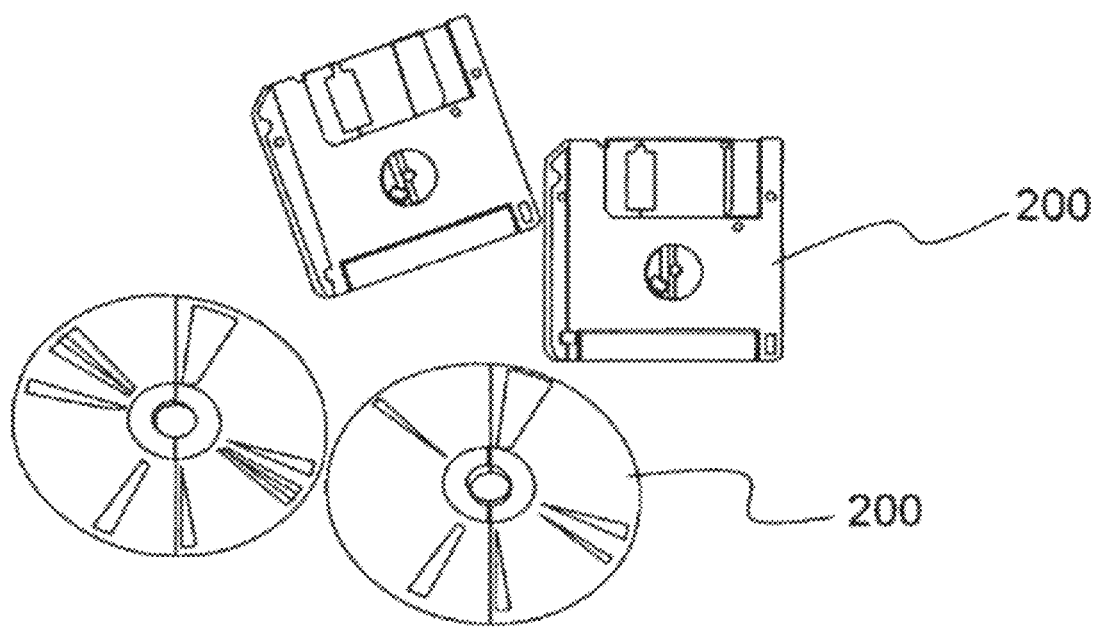
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

The present invention relates to a learning system, such as an artificial intelligence (AI) system. The traditional approach to machine intelligence pursued by the AI community has provided many achievements, but has fallen short of the grand vision of integrated, versatile, intelligent systems. Revolutionary advances may be possible by building upon new approaches inspired by cognitive psychology and neuroscience. Such approaches have the potential to assist the understanding and modeling of significant aspects of intelligence thus far not attained by classic formal knowledge modeling technology.

This invention addresses the design and development of computational models of human cognition based on cognitive architectures that have the potential to surpass existing AI technologies in realizing truly intelligent and adaptive systems. Thus, the present invention as Human Affective Computer Modeling (HACM) is a novel neuroscience-inspired comprehensive architecture that seamlessly integrates perception, memory, planning, decision-making, action, self-learning and affect to address the full range of human cognition as a modeling, predictive, and/or diagnostic tool. One of the limitations of neurally-inspired brain architectures of the prior art is that they tend to solve modal problems (e.g., visual object recognition, audition, motivation, etc.) in disparate architectures whose design embodies specializations for each modal problem.

AN or HACM is based on the concept of the variations in processing of and reactions to repeated or similar perceived internal and external stimuli that result in predictable and/or diagnostic modeling of human behavior using processing and analytic algorithms that learn using instant and continuous parallel processing of input data corresponding to repeated and/or external sensory inputs that evoke reactions, affects, and/or emotions that can be computer modeled to model, predict, and/or diagnose normal and abnormal neurological and/or psychological emotional, physical, and/or neurological responses. AN or HACM can thus provide behavioral computer modeling that replicates brain operating principles to realize structural, functional and temporal modularity and integrate the various neural processes into a unified system that can exhibit a wide range of cognitive behaviors. This comprehensive computer modeling architecture can model, predict, diagnose, and/or generate different and expanded ranges of human cognition that can be used both for modeling, predicting, and/or diagnosing human normal and abnormal human behaviors, as well as for providing or developing cognitive systems that can not only successfully function in a wide range of environments, but also thrive in new environments.

Optionally, the present invention and its adaptive, self-organizing, hierarchical architecture and integration methodology provide practical computational models that scale with problem size. Additionally, the present invention optionally includes a framework to implement computational models of human cognition that can be used to improve, treat, correct, diagnose, and/or simulate human behavior and approach human cognitive performance in a wide range of situations. The AN or HACM can be integrated into a variety of applications and existing systems, providing support or replacement for human reasoning and decision-making, leading to revolutionary use in a variety of applications. Non-limiting, examples of such applications include exploration systems, intelligence gathering/analysis, autonomous systems, cognitive robots, smart sensors, etc.

As briefly described above, optional aspects of the invention can provide one or more of computer modeling architectures that realize structural, functional and temporal modularity. The present invention also integrates the various modeling of one or more neural processes into a unified system that can exhibit a wide range of cognitive behaviors to solve modal problems. The architecture of the present invention is fully distributed in its structure and functional capabilities and lends itself to practical computational architectures. It is an inherently nonlinear and parallel architecture that offers a powerful alternative to the probabilistic and linear models of traditional AI-based systems.

Optionally, the present invention provides a representation of complex information in forms that make it easier to perform inference and organized self-learning that makes it applicable to various domains without extensive programming or reprogramming. It can therefore be used to provide and/or develop cognitive systems as well as interface to conventional AI systems for application in diverse domains (e.g., treating, improving, augmenting, or modeling human performance and/or behavior across a range of intelligence domains).

Such a comprehensive architecture can model many types and ranges of human cognition and provide cognitive systems that not only successfully function in a wide range of environments, but also thrive in new environments.

DETAILS OF THE INVENTION

The present invention relates to a continuously learning and optimizing artificial intelligence (AI) adaptive neural network (ANN) computer modeling methods and systems, designated "human affect computer modeling" (HACM) and, more particularly, to AI methods, systems and devices that can recognize, interpret, process and simulate human reactions and affects such as emotional responses to internal and external sensory stimuli, that provides real-time reinforcement learning modeling that reproduces human affects and/or reactions. The human affect computer modeling (HACM) can be used singularly or collectively to modeling and predict complex human reactions and affects.

The human affect computer modeling (HACM) can be used singularly or collectively to modeling and predict complex human reactions and affects, such as emotional responses to internal and/or external stimuli. Such AI ANN learning systems can optionally comprise a sensory input collection module, a cognitive learning module, and an execution module. The sensory input collection module is operative to receive and process an external sensory input from at least one external environment and at least one internal environment and collect and record data representing the sensory input data as representing velocity and acceleration vectors corresponding to sensory input-specific features from the external sensory input. The cognitive learning module is operative to receive the sensory input data as representing velocity and acceleration vectors corresponding to sensory input-specific features and identify a current context AI ANN model based on the sensory input-specific features, and, based on the current context AI ANN model and features, learn, construct, or recall a set of action plans and evaluate the set of action plans against any previously known action plans in a related context and, based on the evaluation, selecting the most appropriate action plan given the current context. The execution module is operative to carry out the action plan.

One of the limitations of neurally-inspired brain architectures that has been characterized to date is that they tend to solve modal problems (visual object recognition, audition, motivation, etc.) in disparate architectures whose design embodies specializations for each modal problem. The present invention overcomes these problems by providing computer modeling architectures that can be adapted to all these problems. This architecture is fully distributed in its structure and functional capabilities. One or more aspects of the present invention is to provide complementary processing which postulates several complementary and hierarchically interacting processing streams and sub regions that cooperate and compete in parallel. This interaction helps overcome informational uncertainty to solve problems in perception and learning. One key CP of the architecture is laminar computing which postulates a uniform layered format/structure for neural circuitry in various brain regions. This CP offers a unique and explicit formulation of the brain's approach to reusable computing with sharing of neural resources for perception and action. Yet another key theme of the present invention is that the brain has evolved to carry out autonomous adaptation in real-time to a rapidly changing and complex world. Use of Adaptive Resonance Theory (ART) as an underlying mechanism in the architecture of the present invention explains this autonomous adaptation. This architecture also integrates learning mechanisms, adaptively timed neural circuits, and reinforcement-learning based neural circuits that model emotional and motivational drives to explain various cognitive processes, including reasoning, planning, and action. The present invention optionally controls a flexible repertoire of cognitive behaviors that are most relevant to the task at hand. These characteristics are realized using an inherently nonlinear and parallel architecture and offers a powerful alternative to the probabilistic and linear models of traditional Artificial Intelligence (AI)-based systems.

Figure 3:
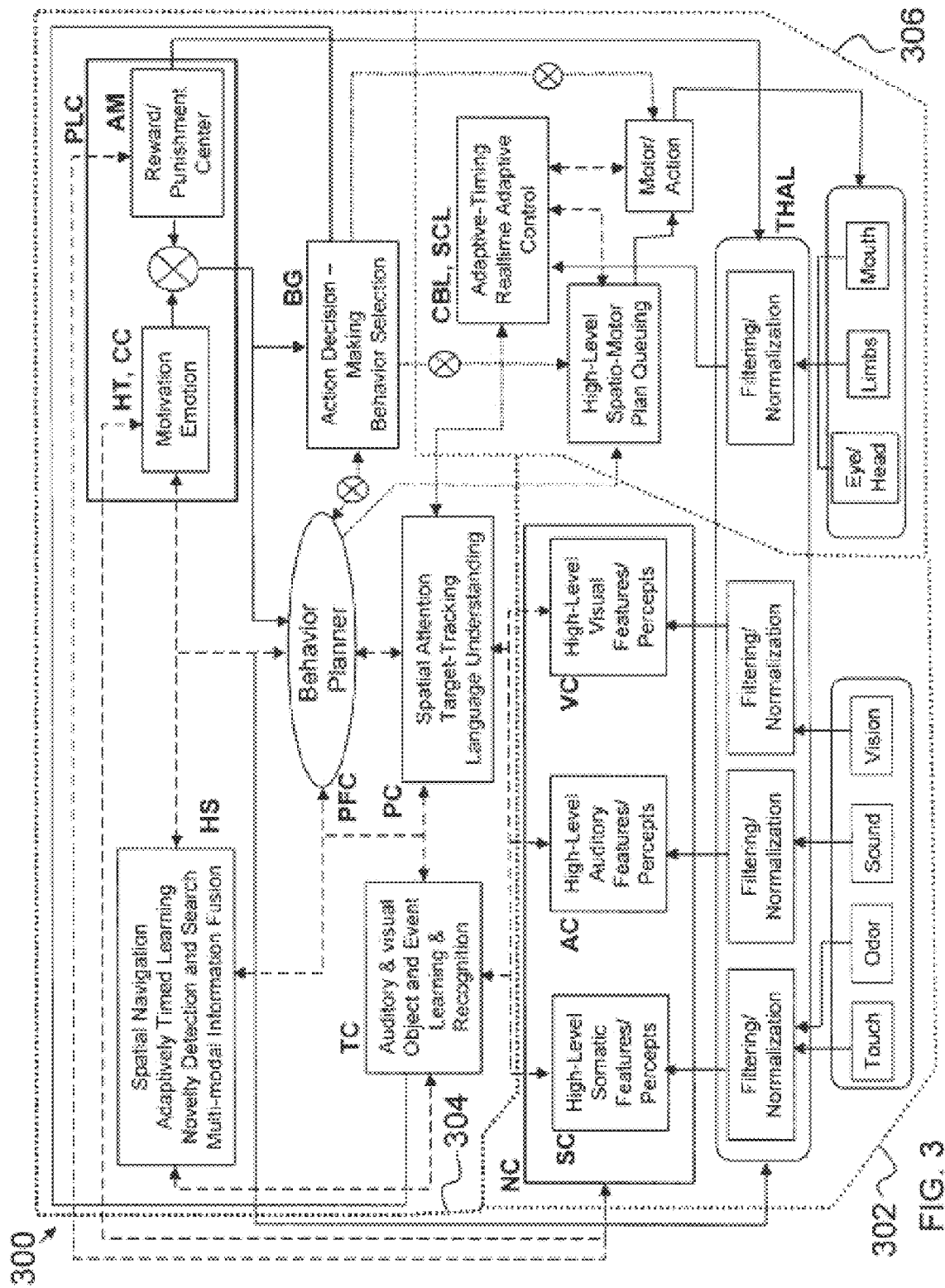
FIG. 3 is an illustration of the neuromorphic architecture according to the present invention.

The architecture of the present invention can optionally be described as modules or systems that correspond to various cognitive and motor features. As shown in FIG. 3, the system 300 includes three basic modules, a sensory input collection module 302, a cognitive learning module 304, and an execution module 306. The large dashed arrows indicate a distributed set of links between any two structural entities to perform match learning (based on ART like circuits, described below) while the small dotted arrows indicate a distributed set of links between any two structural entities to perform mismatch learning (described below).

The modules are described by providing an account of functional roles simultaneously at various stages as data is processed from the "bottom" to the "top" of the cortex. At the lowest level of the architecture is the sensory input collection module 302. The sensory input collection module 302 includes a set of peripheral sense organs including vision, auditory, and somatosensory sensors to sense the state of the external world. In other words, the sensory input collection module 302 is configured to receive and process external sensory input[s] from at least one external environment and at least one internal environment and collect and record data representing the sensory input data as representing velocity and acceleration vectors corresponding to sensory input-specific features from the external sensory input.

The cognitive learning module 304 is configured to receive the sensory input data as representing velocity and acceleration vectors corresponding to sensory input-specific features and identify a current context AI ANN model based on the sensory input-specific features. Based on the current context AI ANN model and features, the cognitive learning module 304 learns, constructs, or recalls a set of action plans. The cognitive learning module 304 then evaluates the set of action plans against any previously known action plans in a related context. Based on the evaluation, the cognitive learning module 304 selects the most appropriate action plan given the current context.

Finally, the execution module 306 is configured to carry out the action plan. The execution module 306 includes motor organs to perform actions based on the perception of the world, including oculomotor (eyes to saccade and fixate on targets), articulomotor (mouth to produce speech), and limbs (to move, reach for objects in space, grasp objects, etc.). For clarity, each of the basic modules and their corresponding sub-modules will be described in turn.

Sensory Input Collection Module

The sensory input collection module 302 generates and processes external and/or internal sensory inputs from at least one external environment and at least one internal environment and collect and record data representing the sensory input data as representing velocity and acceleration vectors corresponding to sensory input-specific features from the external sensory inputs.

Preprocessing

Figure 4:
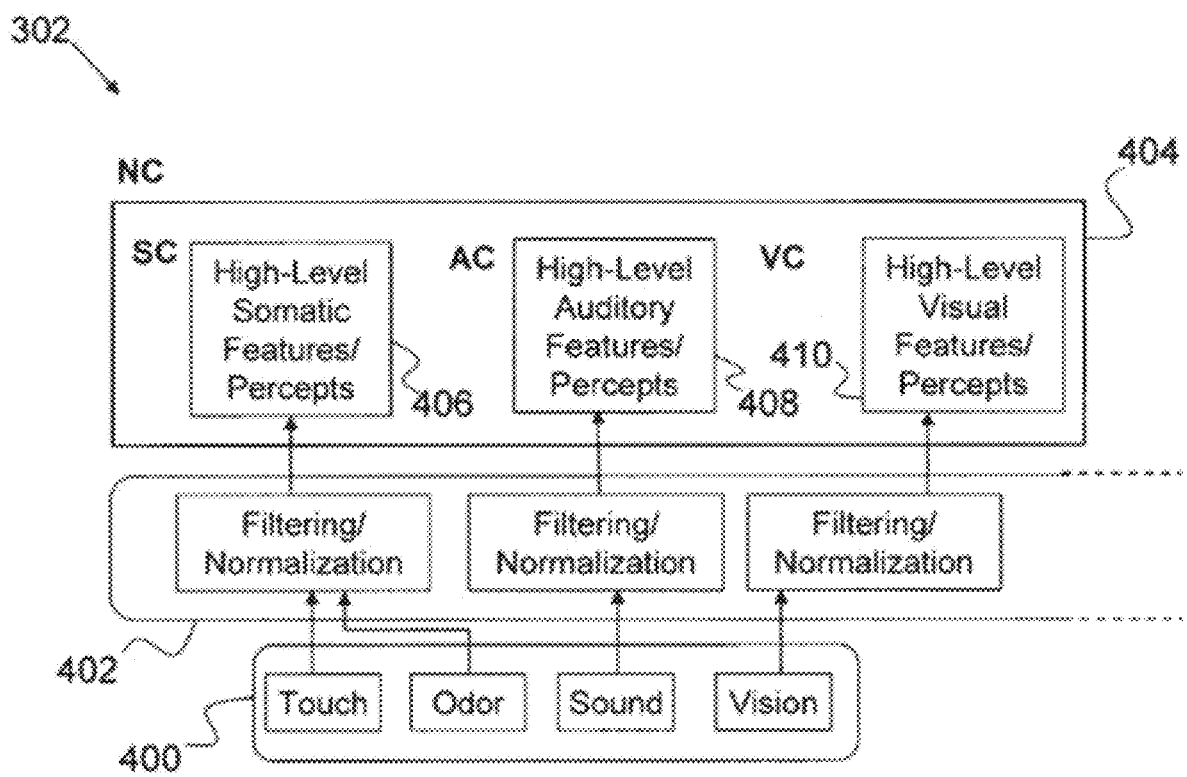
FIG. 4 is an illustration of the architecture of a sensory input collection module according to the present invention.

FIG. 4 is an illustration of the architecture for the sensory input collection module 302. As shown in FIG. 4, at the input level, the information input rate is limited by the spatial and temporal sampling rate of the sensors 400. Samples are best taken at high rates to gather maximum information. This generates a large amount of data, only a small fraction of which is relevant in any one situation. To collect and record data representing useful information from this data, a preprocessing step is first initiated. During this step, the incoming data (external sensory inputs) for each modality (e.g., somatic sensor, auditory sensor, visual sensor) is filtered and normalized in a separate specialized circuit within a thalamus module 402 (THAL) (e.g., lateral geniculate nucleus (LGN) for vision (parvocellular and magnocellular divisions as known in the art)).

These functions are realized via cooperative-competitive interactions (on-center off-surround) within the thalamus module 402. This helps in preserving the relative sizes and, hence, relative importance of inputs and thereby helps overcome noise and saturation (described as the noise-saturation dilemma as known in the art). Each modality is filtered and normalized using any suitable technique for filtering and normalizing external sensory inputs, as known in the art.

Perception

The next step in processing is to abstract relevant information from the filtered and normalized input data. This abstraction process is initiated in a neocortex module 404 (NC) and propagates throughout cognitive learning module. The neocortex module 404 collect and record data representing the sensory input data as representing velocity and acceleration vectors corresponding to sensory input-specific features from the external and/or internal sensory inputs (after they have been filtered and/or normalized by the thalamus module 402). The neocortex module 404 includes a somatic cortex (SC) module 406, an auditory cortex (AC) module 408, and a visual cortex (VC) module 410. The SC module 406 collect and record data representing somatic features from the scene, such as touch and odor. Additionally, the AC module 408 collect and record data representing auditory features, while the VC module 410 collect and record data representing visual features.

The neocortex module 404 is a modular structure that can integrate information from a remarkably diverse range of sources: bottom-up signals stemming from the peripheral sense organs; top-down feedback carrying goal related information from higher cortical areas (as explained later); and intrinsic horizontal signals carrying contextual information from neighboring regions within the same cortical area. These three distinct types of signals not only coexist within a single cortical area, but also interact and mutually shape each other's processing (as known in the art).

The present invention addresses these interactions based on laminar computing (as known in the art). Laminar computing concerns the fact that the cerebral cortex, the seat of all higher biological intelligence in all modalities, is organized into layered cortical circuits (usually six main layers) with characteristic bottom-up, top-down, and horizontal interactions. Specializations of these interactions in the different cortical areas realize different combinations of properties. Thus, the layered cortical circuit that "processes information" in the sensory cortex of a human when his/her hand is touched is the same circuit that "processes information" in the frontal cortex of a human when it thinks about a calculus problem. This incredible ubiquity means that the basic function of cortex is independent of the nature of the data that it is processing. The existence of such a unified laminar format for many different tasks also points to the possibility of developing very large-scale integration (VLSI) systems for intelligent understanding and control.

In the present invention, the notion of perception for different modalities is realized by integrating lower level features into a coherent percept within the neocortex module 404. This integration process is incorporated using the idea of complementary processing streams. In the present architecture, several processing stages combine to form a processing stream much like that in the brain. These stages accumulate evidence that realize a process of hierarchical resolution of informational uncertainty. Overcoming informational uncertainty utilizes both hierarchical interactions within the stream and the parallel interactions between streams that overcome their complementary deficiencies. For example, visual perception of form in the present architecture occurs via an ensemble of processing stages that interact within and between complementary processing streams. Boundary and surface formation illustrate two key principles of this capability (as known in the art). The processing of form by the boundary stream uses orientationally tuned cells (as known in the art) to generate emergent object representations as supported by several psychophysical and neurophysiological experiments (as known in the art). Precise orientationally-tuned comparisons of left eye and right eye inputs are used to compute sharp estimates of the relative depth of an object from its observer (as known in the art), and thereby to form three-dimensional boundary and surface representations of objects separated from their backgrounds (as known in the art). Similarly, there exist such complementary properties in the form-motion interactions (as known in the art) of the architecture for visual perception of moving objects. The orientationally-tuned form system that generates emergent representations of forms with precise depth estimates is complementary to the directionally-tuned motion system that can generate only coarse depth estimates on its own (as known in the all).

Cognitive Learning Module

As described above, the cognitive learning module receives the sensory input-specific features, identifies a current context, and ultimately selects the most appropriate action plan given the current context. The cognitive learning module utilizes several sub-modules to select the most appropriate action plan.

Learning and Attention: What, Where, and How

Figure 5A:
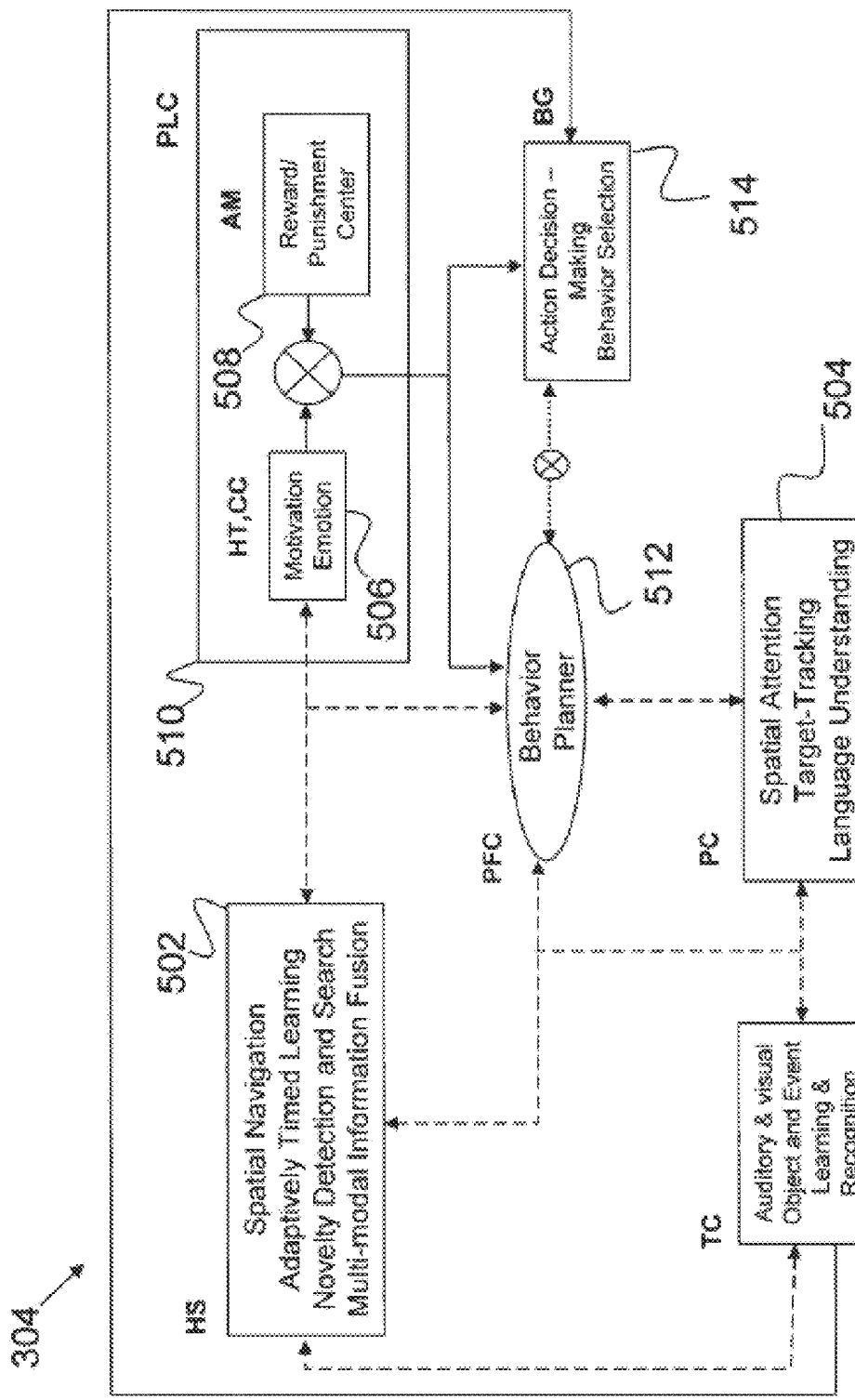
FIG. 5A is an illustration of the architecture of a cognitive learning module according to the present invention.

In the present invention, the complementary form and motion processing is part of a larger design for complementary processing whereby objects in the world are cognitively recognized, spatially localized, and acted upon. As shown in FIG. 5A, the object and event learning system 500 learns to categorize and recognize what objects are in the world (i.e., declarative memory or memory with record). In other words, the object and event learning system 500 is configured to use the sensory input data as representing velocity and acceleration vectors corresponding to sensory input-specific features to classify the features as objects and events. The object and event learning system 500 operates as a classification system, as known in the art.

Another module, the novelty detection, search, and navigation module 502 (described below) determines if the sensory input data as representing velocity and acceleration vectors corresponding to sensory input-specific features match previously known events and objects by comparing the sensory input data as representing velocity and acceleration vectors corresponding to sensory input-specific features against features corresponding to known objects and events. If there is no match, then the object and event learning system 500 stores the features as new objects and events. Alternatively, if there is a match, then the object and event learning system 500 stores the features as updated features corresponding to known objects and events. The object and event learning system 500 is analogous to the inferotemporal cortex (TC) and its cortical projections in a human's brain. As can be appreciated by one skilled in the art, the TC is the object and event learning system 500 and the TC is referred to herein interchangeably with the said system 500.

The object and event learning system 500 is to be contrasted with the spatial representation module 504, which learns to determine where the objects are and how to deal with them by locating them in space (i.e., procedural memory or memory without record), tracking them through time (i.e., when) and directing actions toward them (as known in the art). The spatial representation module 500 is configured to establish space and time attributes for the objects and events. The spatial representation module 500 uses any suitable device or technique for establishing space and time attributes given objects and/or events, as known in the art.

The spatial representation module 504 transmits the space and time attributes to the novelty detection, search, and navigation module 502. The novelty detection, search, and navigation module 502 is also configured to use the space and time attributes to construct a spatial map of the external world. The novelty, detection, search, and navigation module 502 constructs a spatial map using any suitable technique for converting space and time attributes into a spatial map, as known in the art.

The novelty detection, search, and navigation module 502 is analogous to the Hippocampal System (HS), and as can be appreciated by one skilled in the art, the HS is referred to herein interchangeably with the said module 502. Additionally, the spatial representation module 504 is analogous to the parietal cortex (PC) and its cortical projections in a human's brain, and as can be appreciated by one skilled in the art, the PC is referred to herein interchangeably with the module 504.

The cortical projections (mentioned above) are realized using AN or HACM circuits within the architecture of the present invention (dashed lines between modules in FIGS. 3 through 6) (analogous to ART based systems, as known in the art). These circuits are supported by neurophysiological data (as known in the art). Additionally, variants of ART have been used in several technological applications (as known in the art). Replacing AN or HACM for ART circuits facilitate complementary interactions between the attentional subsystem (in the TC) and the spatial representation module 504 or the novelty detection, search, and navigation module 502 (as known in the art). The replacement with AN or HACM for ART circuits enable the present invention to discover and stably learn new representations for novel objects in an efficient way, without if representations already exist for yet unseen objects.

In the present invention, auditory and speech percepts are emergent properties that arise from the resonant states of the AN or HACM circuits. For example, the present invention can use AN or HACM circuits analogous to ARTSTREAM (as known in the art) to separate distinct voices (such as those in a cocktail party environment) into distinct auditory streams. Resonant dynamics between a spectral stream level at which frequencies of the sound spectrum are represented across a spatial map, and the pitch stream level that comprise a given pitch helps separate each auditory stream into a unique spatial map. Similarly, resonant waves between bottom-up working memory that represents the individual speech items and a top-down list categorization network that groups the individual speech items into learned language units or chunks is modeled in AN or HACM analogous to ARTPHONE (as known in the art) to realize phonemic restoration properties.

Figure 6:
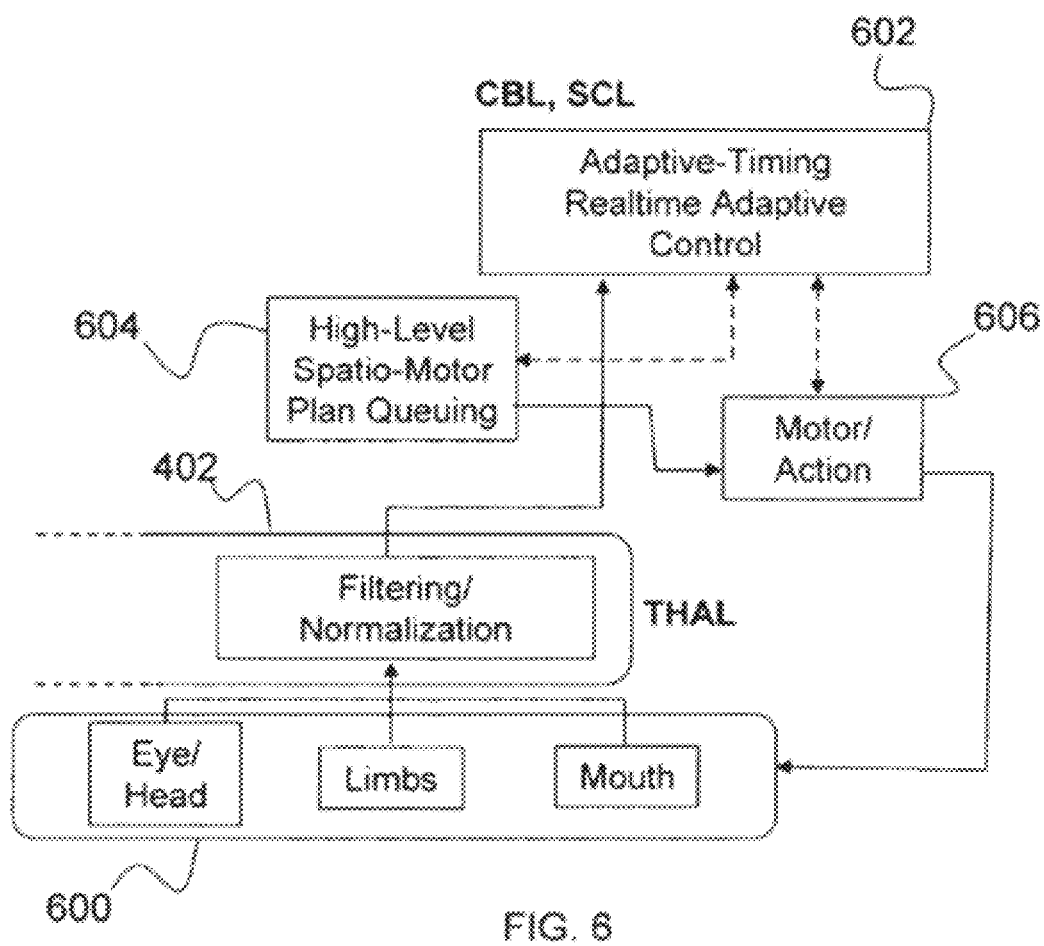
FIG. 6 is an illustration of the architecture of an execution module according to the present invention.

In addition to what and where streams, there is a how processing stream that operates in parallel and provides the capability to take actions based on the sensed world. First, as shown in FIG. 6, the signals from the muscles that control the motors 600 are filtered in the thalamus module 402. To effectively realize its actions (such as visually guided reaching of targets or gasping), the system uses the how stream to map the spatial representation of targets in the PC into a head-centered representation (as known in the art) and eventually a body-centered representation (as known in the art). This representation is invariant under rotations of the head and eyes (e.g., sensors such as a camera). Intrastream complementarity (as known in the art) occurs during this process wherein vergence of the two eyes/cameras, as they fixate on the object, is used to estimate the object's radial distance, while the spherical angles that the eyes make relative to the observer's head estimate the object's angular position. The head-centered representation of targets is used to form a spatial trajectory from the current position to the target position.

The inverse kinematics problem is solved when the spatial trajectory is transformed into a set of joint angle commands (as known in the art) via information available during action-perception cycles. The inverse dynamics problem is solved by the invariant production of commanded joint angle time courses despite large changes in muscle tension (as known in the art).

Similarly, neural circuits exist in the architecture to model other modalities, such as the act of speaking that utilizes perceptual information from the auditory cortex during action perception cycles (as known in the art). These neural circuits with a unified format learn all these sensory-motor control tasks based on interactions between the PC, the motor cortex (MC) module (described below), the external valuation module (described below), and the cerebellum (CBL) module (described below). For these "basic" sensory-motor control tasks, the architecture of the present invention does not need to know what that target is. It relates to the target object as a set of possible affordances (as known in the art) or opportunities for reaching and grasping it as known in the art.

Spatio-Temporal Learning

In higher cortical areas, as the signals move higher up in complexity space, time differences in neuronal firing induced by the input patterns become important. These higher areas model the relationships between high-level representations of categories in various modalities using temporal information (such as temporal order of objects/words/smells in the TC). The present architecture achieves this temporal learning capability using a combination of ART category learning, working memories, associative learning networks, and predictive feedback mechanisms (as known in the art) to learn event categories.

As shown in FIG. 5A, the prefrontal cortex (PFC) serves as a working memory (as known in the art) where information converges from multiple sensory modalities which interacts with subcortical reward mechanisms (as in the amygdala (AM) module 506 and hypothalamus (HT) module 508 of the internal valuation module 510 (described below)) to sustain an attentional focus upon salient event categories. The PFC is analogous to the behavior planner module 512, and as can be appreciated by one skilled in the art, the PFC is referred to herein interchangeably with the said module 512. Essentially, the behavior planner module 506 is configured to receive information about the objects and events, the space and time attributes for the objects and events, and the spatial map. The behavior planner module 506 uses those inputs to learn, construct, or recall a set of action plans. Additionally, the behavior planner module 506 uses the status of the internal state (provided by the internal valuation module 510) to sub-select the most appropriate action from the set of action plans.

Multimodal information distributed across the PFC is integrated using AN or HACM analogous to ART (as known in the art) that is designed to selectively reset input channels with predictive errors and selectively pay attention (ignore) to event categories that have high (low) salience due to prior reinforcement. The interactions between the TC and the PFC are a type of macro-timing process that integrates information across a series of events. The architecture of the present invention models the TC-HS interactions as a type of micro-timing process using an adaptive timing model that controls how cognitive-emotional and sensory-motor interactions are coordinated (as known in the art) based on the interactions of the sensory representations (in TC), the drive representations (in the internal valuation module 510), and the motor representations (in the external valuation module 514 and the cerebellum (CBL) module). The motor representations also contribute to the modulation of declarative memory by motivational feedback and to the learning and performance of procedural memory.

The present invention is also optionally capable of exhibiting complex task-driven visual behaviors for the understanding of scenes in the real world (as known in the art). Given a task definition, the architecture of the present invention first determines and stores the task-relevant/salient entities in working memory, using prior knowledge stored in the long-term memory of AN or HACM circuits analogous to ART circuits. For a given scene, the model then attempts to detect the most relevant entity by biasing its visual attention with the entity's learned low-level features. It then attends to the most salient location in the scene and attempts to recognize the object (in the TC) using AN or HACM circuits analogous to ART circuits that resonate with the features found in the salient location. The system updates its working memory with the task-relevance of the recognized entity and updates a topographic task relevance map (in the PC) with the location of the recognized entity. The stored objects and task-relevance maps are subsequently used by the PFC to construct predictions or plans.

For more complex sensory-motor coordination tasks such as speaking and language understanding, the present invention capitalizes on the unified format of the above mentioned neural circuitry. The present invention integrates the PC and the coordinated control plans for action (or frontal motor schemas), including the PC's interaction with recognition (TC), planning (PFC) and behavioral control systems (external valuation module) (as known in the art). This architecture is grounded in the use of mechanisms of vocal, facial and manual expressions that are rooted in the human's praxic interactions with the environment (as known in the art). The present invention incorporates spatial cues to aid audition/speech comprehension (as known in the art), temporal chunking (as known in the art), phonemic restoration (as known in the art) and speech production models (as known in the art).

Emotion and Motivation

Because humans are physiological beings, humans have basic motivations that demand satisfaction (e.g., eating, drinking, sleeping, etc.). Each behavior can either satisfy or not satisfy one of these motivations. The present invention includes an internal valuation module 510 to mimic basic human motivations. The internal valuation module 510 is configured to evaluate the value of the sensory input data as representing velocity and acceleration vectors corresponding to sensory input-specific features and the context. For example, the internal valuation module values the sensory input data as representing velocity and acceleration vectors corresponding to sensory input-specific features and context such that they are modeled mathematically to have a value in a range between zero and one, where zero is the least valuable and one is the most valuable, as known in the art.

The internal valuation module is also configured to generate a status of internal states of the system and given the context, associate the sensory input data as representing velocity and acceleration vectors corresponding to sensory input-specific features to the internal states as either improving or degrading the internal state. As a non-limiting example, the system is incorporated into a mobile robot. The robot determines that it is currently raining and that it is wet. Based on its knowledge of electrical systems, the robot determines that it would be best to seek cover to avoid the rain. Since the robot is currently traveling in a direction away from cover, the robot determines that to continue in its current trajectory will increase its wetness (or time being wet), and thereby degrade its internal state (increasing its wetness which is contrary to its desire to be dry).

In other words, when an ongoing behavior/perceptual state enters the prelimbic cortex (PLC) (as known in the art) as an input, a correlated emotional response is generated. The PLC is analogous in function to the internal valuation module 510, and as can be appreciated by one skilled in the art, the PLC is referred to herein interchangeably with the said module 510.

The internal valuation module 510 includes two sub-modules, the AM module 508 and the in module 506. The AM module 508 is a reward/punishment center that generates a reward or punishment for certain actions. The rewards or punishments are defined as valuations of the internal state of the system and whether certain actions degrade or improve the internal state. The HT module 506 learns to correlate these behavior patterns with feedback signals to the behavior planner module 512 and the novelty detection, search, and navigation module 502 that map the sensory representations using ART circuits. Emotions are produced in response to behaviors that impact currently active actions or motivational drives. Each cortical plan/prediction of behavior (from the behavior planner module 512) enters the internal valuation module 510 as spatio-temporal patterns that produce as output the emotional reaction to each plan. The output of the behavior planner module 512 describes what is going to happen, while the output of the internal valuation module 510 describes what should happen. Mismatches between the behavior planner module 512 and the internal valuation module 510 are used by the external valuation module 514 to compute expected utility of the currently active action plan based on the models, is known in the art. If the mismatch is large, then the external valuation module 514 will inhibit (attentional blocking of) the current behavior (action plan) and a new one is selected.

In other words, the external valuation module 514 is configured to establish an action value based purely on the objects and events. The action value is positively correlated with action plans that are rewarding to the system based on any previously known action plans. The external valuation module 514 is further configured to learn from the positive correlation to assess the value of future action plans and scale a speed at which the action plans are executed by the execution module (element 306 in FIGS. 3 and 6. Finally, the external valuation module 514 is configured to open a gate in a manner proportional to the action value such that only action plans that exceed a predetermined action value level can proceed to the execution module 306.

In the architecture of the present invention, this inhibition is modeled as an on-center off-surround within the external valuation module 514, as known in the art. This will enable the architecture to model decision making for complex spatial and motor processes, such as planned eye/camera saccades (as known in the art) and control of catching a target object (as known in the art). Once the decision to act is made by the external valuation module 514, the complex motor sequences for the selected or contextually appropriate behaviors/plan (available in the behavior planner module 512) are reinforced at the internal valuation module 510. As shown in FIG. 6, the selected motor plans are used by a timing control module 602 to execute a set of adaptively-timed actions (movements) until the goal is reached, as known in the art.

For further illustration, FIG. 5B is a table mapping various cognitive functionalities with structures and pathways as related to the architecture illustrated in FIG. 3. The first column lists a cognitive function 516, while the second column lists the corresponding anatomical structure/pathway 518 that carries out the cognitive function 516. As can be appreciated by one skilled in the art, the present invention includes a system, method, and computer program product that is configured to perform the various cognitive functions 516 using a corresponding module/pathway.

Execution Module

As described above and shown in FIG. 6, the execution module 306 is configured to carry out the action plan. Actions are manifested in the form of motor plans (action plans), non-limiting examples of which include running, yelling, etc. The selected action plans are used by the CBL and SC to execute a set of adaptively timed actions (movements) until the goal is reached. Here the CBL serves as an organ for adaptive control real-time control circuits that can use the information about the evolving sensory-perceptual context, and about errors in realization of the desired goal to continually correct itself until the desired goal state is achieved.

More specifically, the execution module 306 includes a queuing module 604 to receive the action plans and order them in a queue sequentially per their action value. Additionally, the timing control module 602 determines the speed at which to execute each action plan. A motor/action module 606 is included that integrates the order and speed at which to execute the action plans. The motor/action module 606 then sends a signal to the corresponding motor 600 to sequentially execute the action plans according to the order of the queue and the determined speed. Based on the sequential execution, the timing control module 602 learns the timing of the sequential execution for any given action plan to increase efficiency when executing similar action plans in the future.

Consciousness

In the architecture of the present invention, all resonant states are conscious states (as known in the art). If a particular region (module) is strongly resonating with the bottom-up stimuli, the system is more conscious of those events. Any learned spatio-temporal pattern is determined partly by bottom-up data and partly by top-down selection. The degree to which the system is conscious of particular actions is determined by how much the representation was formed by top-down selection (in the TC, HS, and PFC) or degree of resonance, as opposed to being determined by bottom-up data. Thus, firing patterns in sensory and cognitive areas that are directly selected (by attention) have the most meaning in the architecture and it is most conscious of its activity at that time. When the models described above are combined into the comprehensive system architecture for intelligent behavior, the sensory and cognitive match-based networks in the What processing stream provide self-stabilizing representations with which to continually learn more about the world without undergoing catastrophic forgetting. The Where/How processing stream's spatial and motor mismatch-based maps and gains can continually forget their old parameters to instate the new parameters that are needed to control the system in its present form. Since the spatial and motor or procedural memory processes are often based on inhibitory matching, it does not support excitatory resonance and hence cannot support consciousness in the architecture. The complementary match and mismatch learning mechanisms within this larger architecture combined with the adaptive timing circuits that mediate their interactions illustrates how circuits in the self-stabilizing match-based sensory and cognitive parts of the brain can resonate into consciousness (as known in the art), even while they are helping to direct the contextually appropriate activation of spatial and motor circuits to perform cognitive actions. The mechanisms that unify these effects within the architecture are inherently nonlinear and parallel and offer a powerful alternative to the probabilistic and linear models currently in use.

Non Limiting Examples

A non-limiting example of the present invention is composed of an Artificial Neural Network (ANN) learning module configured to learn to predict a position locator on a linear continuous track based upon a plurality of inputs and outputs to the ANN learning module. The ANN must be capable of continuous machine learning since changes to the position locator must constantly update to provide the required affective (emotional) feedback metrics.

Figure 7:
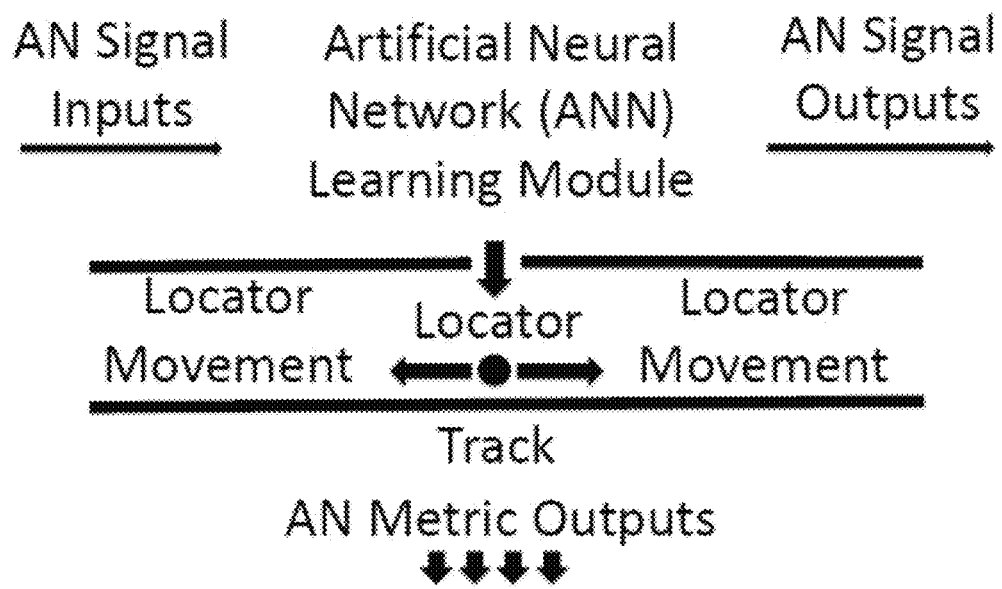
FIG. 7 is a block diagram depicting the components of an affective neuron module of a human affect computer modeling (HACM) of a non-limiting example of an artificial intelligence system according to the present invention.

An example of a suitable ANN learning module for the human affect computer modeling (HACM) is shown in FIG. 7, such as comprising an Artificial Neuron (AN) is using or providing at least one artificial neural network (ANN) as incorporating a Cerebellar Model Articulation Controller (CMAC). The CMAC is a type of neural network based on a model of the mammalian cerebellum. CMAC computes a function f(x1, . . . xn), where n is the number of input dimensions. The input space is divided up into hyper-rectangles, each of which is associated with a memory cell. The contents of the memory cells are the weights, which are adjusted during training. Usually, more than one quantization of the input space is used, so that any point in an input space is associated with a number of hyper-rectangles, and therefore with a number of memory cells.

As shown in FIG. 7, the output of a CMAC is the algebraic sum of the weights in all the memory cells activated by the input point. A change of value of the input point results in a change in the set of activated hyper-rectangles and therefore a change in the set of memory cells participating in the CMAC output. The CMAC output is therefore stored in a distributed fashion, such that output corresponding to any point in input space is derived from the value stored in a number of memory cells (hence the name associative memory), which provides generalization. The CMAC is an example of an ANN learning module that is a component to the AN. Other ANN learning modules may be substituted instead of the CMAC as required or desired.

The track that the position locator traverses may be one to n dimensions. Subject to the ANN module continuous learning process, the position locator traverses the track subject to different forces of resistance and acceleration (such as gravity or other arbitrary forces, for example). Subject to one or a plurality of real number inputs normalized to be between 0 and 1, the ANN changes the locator position on the track varying velocity (first derivative) and acceleration (second derivative) to achieve the coordinates on the track required to meet the ANN objective function (inputs) in the shortest number of training steps. Affective (emotional) results are recovered by metrics that describe the ease or difficulty associated with the ANN learning the required locator position on the track.

These metrics minimally include: 1) the locator position prediction coordinates, 2) locator position velocity, 3) locator position acceleration, 4) the number of steps required for the HACM or AN module to achieve the desired locator position coordinates on the track, 5) an error metric describing the efficiency of the HACM or AN module moving the locator to the desired position on the track and 6) a return value describing the overall all prediction success rate.

As shown in FIG. 7, the HACM or AN signal outputs reflect the input values exactly so that, for example, the number 0.5 presented to the HACM or AN will be reflected as the output of the HACM or AN once the training period is completed. Consequently, the value of the HACM or AN is not to generalize as is the case with current ANN technologies, it is the HACM or AN Metric outputs that are important. The track of the HACM or AN can have different configurations, for example, instead of a straight track, the track may be curved or have a sinusoidal structure as in a bell curve. Using different track configurations skews the HACM or AN outputs by integrating bias into the HACM or AN learning process. This might be desirable when resistance to change is desired.

Unlike in all other affective technologies, each AN is a highly compact and efficient individual artificial neuron. The number of ANs can be in the millions, which enables highly complex emotional responses and interactions. Each AN has the capacity to have complex emotional responses.

Alternative semiconductor implementations of the Affective Neuron Module (AN) is accomplished with monolithic microwave integrated analog circuits (MMICs), which implement the locator track, locator, the locator movement, and the metric outputs shown in FIG. 7. The AN semiconductor MMIC implementation is dimensionless. Dimensionless refers to unmapped changes to circuit voltage, current, resistance, impedance, and capacitance. These dimensionless electrical circuit element characteristics are mapped to the AN locator movement velocity and acceleration variables, which are reflected in the AN metric-outputs as further described herein.

Figure 7C:
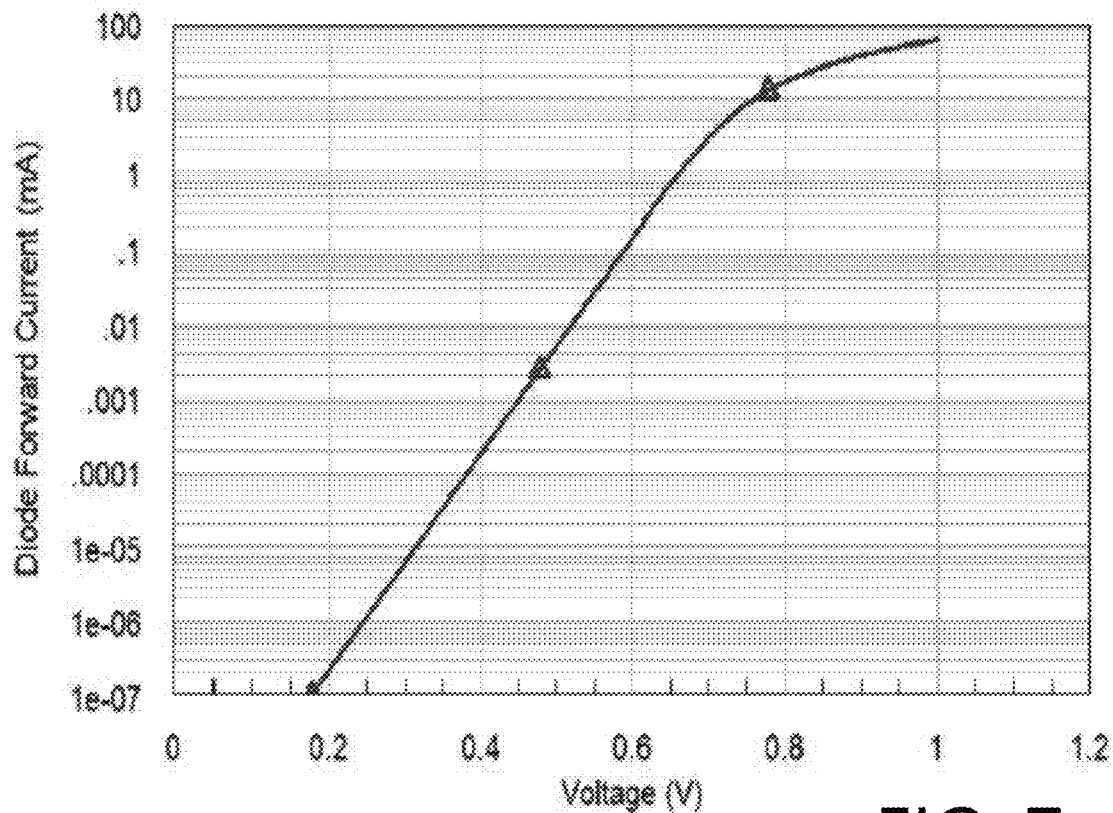
Figure 7D:
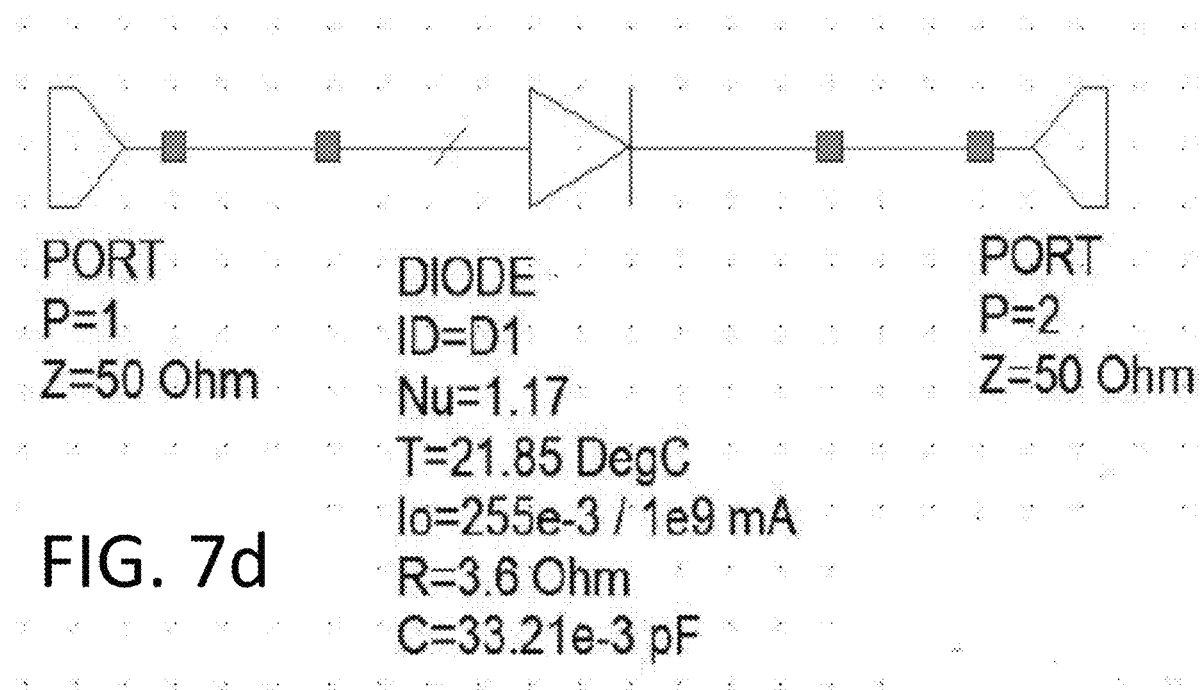

In comparison to inefficient digital implementations of the locator, extremely high operational frequencies extending up and beyond 3000 Gigahertz are provided using a InGaAs diode (FIG. 7d) as the locator as shown in FIGS. 7a and 7b. FIG. 7c shows the locator moving along the diode voltage versus current curve. The triangle in FIG. 7c is the locator, whose position is changed by varying the voltage. Varying the diode voltage moves the locator (the triangles) to a different current.

The current is the position on the locator track (FIG. 7). Additional differential MMIC circuitry is used to measure the locator (current) change (the velocity) and current acceleration. The AN metric output is provided using analog to digital convertors. Alternatively, the entire AN locator track, locator and metric outputs are implemented within the InGaAs MMIC. The AN module implemented in this fashion is dense and the die no larger than a glitter particle, including for pluralities of AN locators, locator tracks, and metric output. The ANN is separately implemented.

Figure 8:
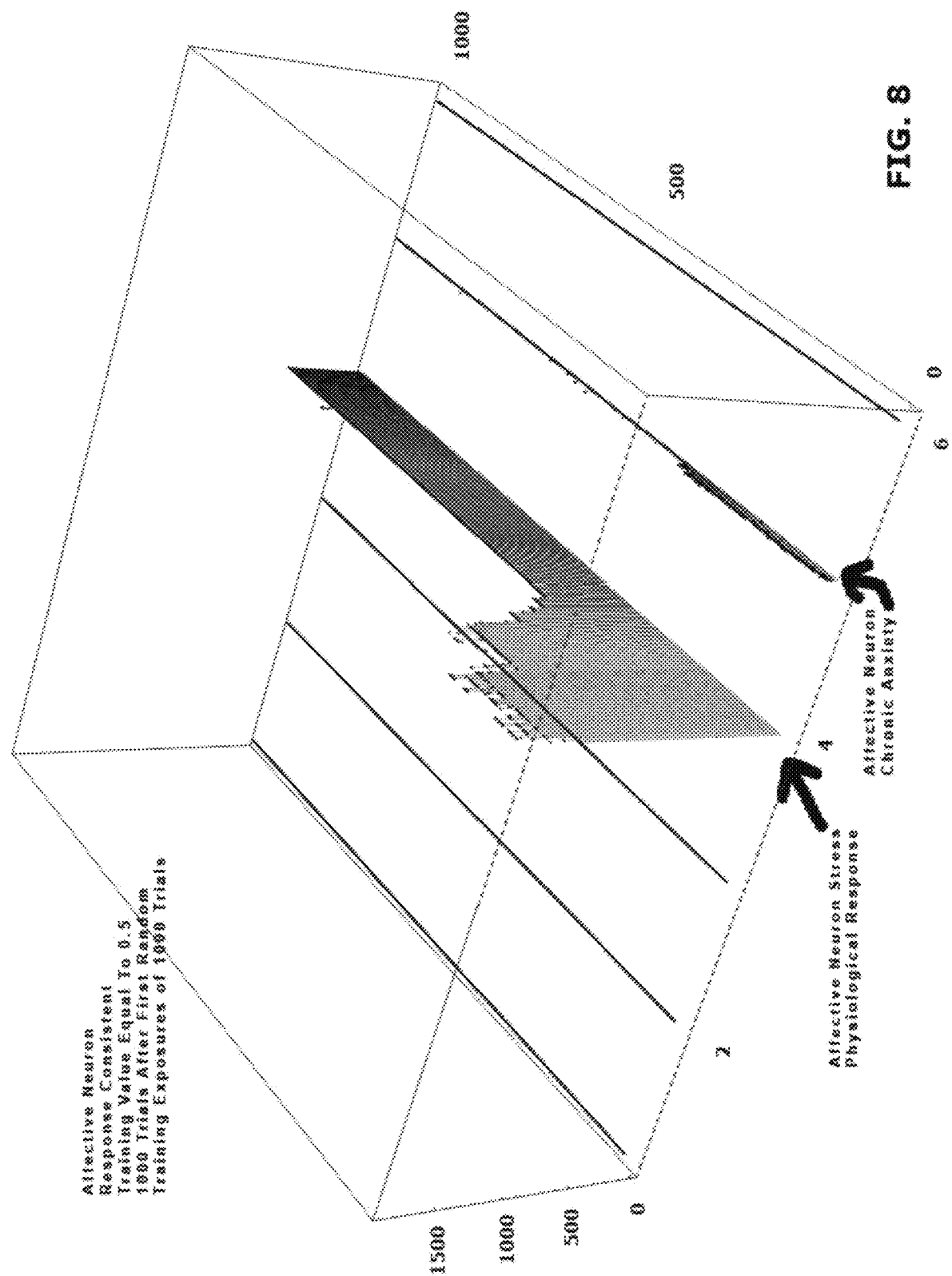
FIG. 8 is a graphical representation comparing plots of physiological stress response and chronic anxiety for modeling a non-limiting example of PTSD modeling and learning responses of an artificial intelligence system and/or method according to the present invention.
Figure 9:
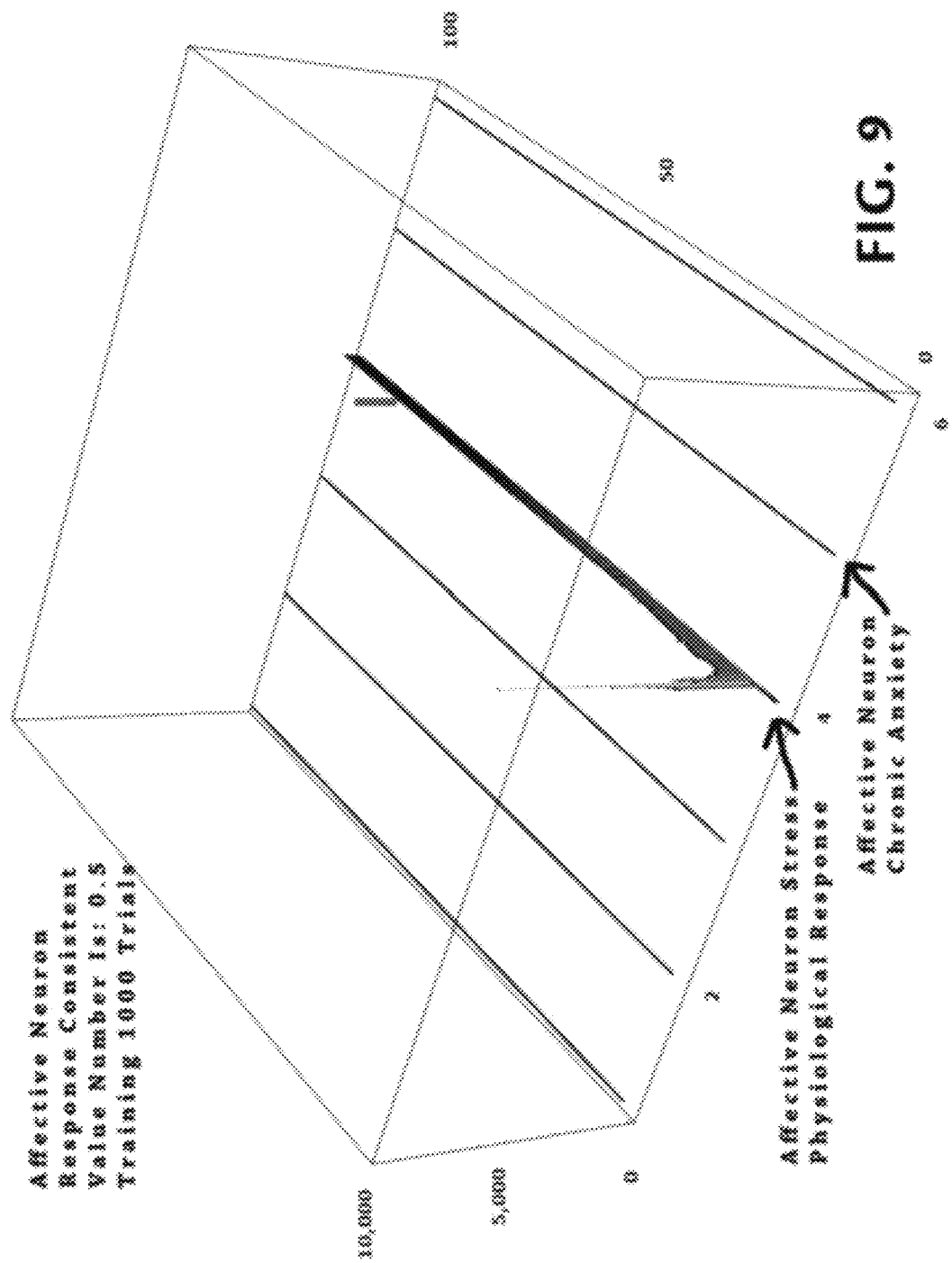
FIG. 9 is a graphical representation comparing plots of physiological stress response and chronic anxiety for modeling a non-limiting example of PTSD modeling and learning responses of an artificial intelligence system and/or method according to the present invention.
Figure 10:
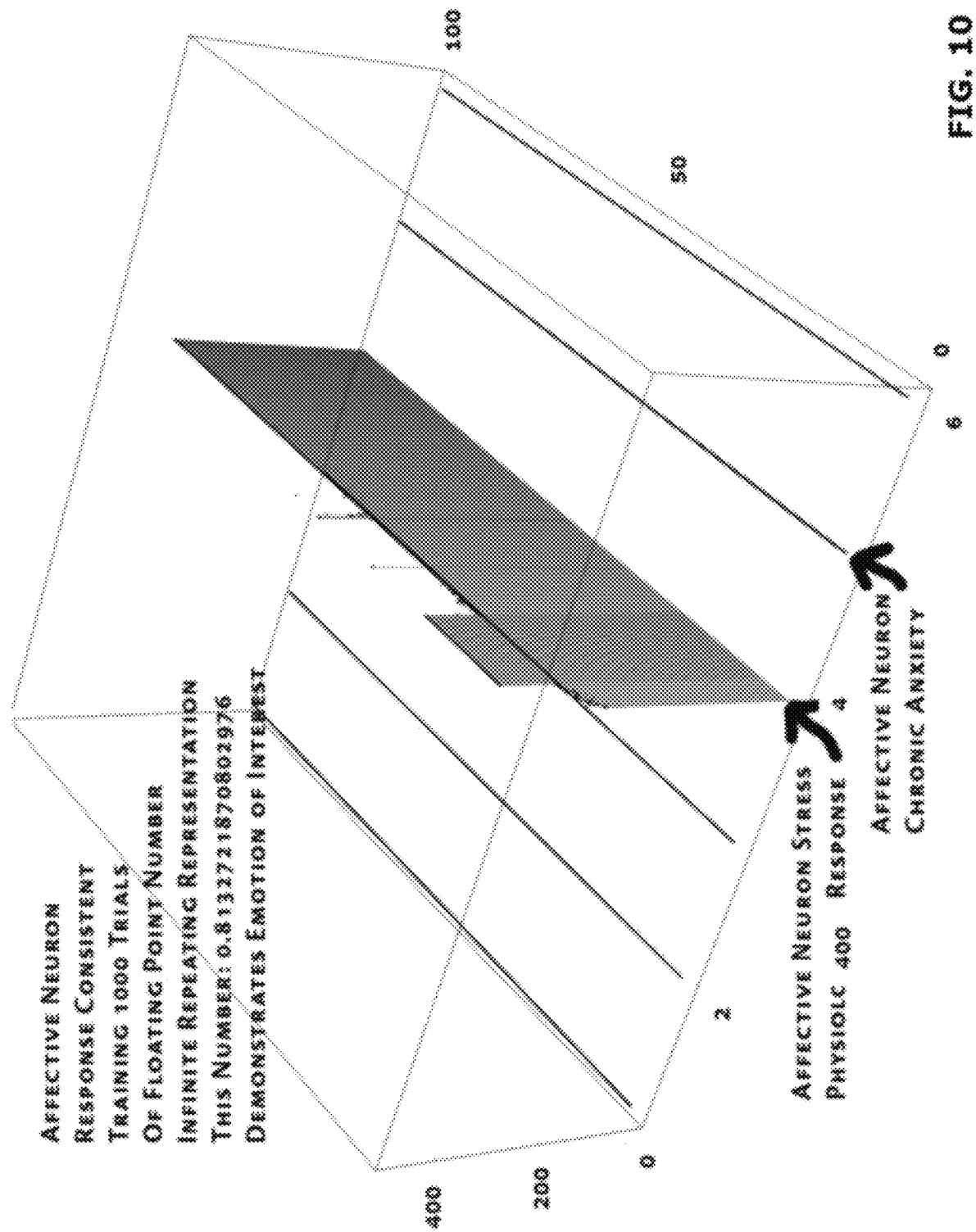
FIG. 10 is a graphical representation comparing plots of physiological stress response and chronic anxiety for modeling a non-limiting example of PTSD modeling and learning responses of an artificial intelligence system and/or method according to the present invention.

The following non limiting exemplary sets of results, as shown in FIGS. 8-10, demonstrate an experiment where a single AN was trained to induce a Posttraumatic Stress Disorder (PTSD) response to environmental stimuli. A non-PTSD AN control is shown below the PTSD training example. This was followed by an example where an individual HACM or AN was trained to be vigilant to infinitely repeating floating point numbers out to sixteen decimal places.

PTSD is a disorder that can develop after a person is exposed to a traumatic event. Here the HACM or AN traumatic event is erratic training. In the second experiment the HACM or AN was trained to be vigilant. The first plot is the PTSD training where the HACM or AN is exposed to random inputs. The second plot shows the PTSD response to the same AN even though it is being exposed to consistent inputs. The third frame is a control that shows a different AN being exposed to consistent inputs. The final plot is a HACM or AN trained to vigilance with respect to a stimulus.

In the plot shown in FIG. 8 a single AN is trained to random inconsistent inputs. Notice the number of steps (4) required for the HACM or AN to respond to the random input becomes progressively more erratic. This indicates a stressful physiological response to forcing the HACM or AN to learn an erratic stimulus that it cannot predict over time. Notice the error metric (5) progressively increases over time indicating the quantitative equivalent of chronic anxiety.

As shown in FIG. 9, the HACM or AN is exposed to erratic stimuli to a consistent signal. Notice that the number of steps (4) required for the HACM or AN to respond to the consistent signal immediately reflects the stress associated with the prior erratic training, even though the input signal is consistently set to 0.5. Although the physiological stress response stabilizes, it is permanently affective by the early erratic training, indicating a PTSD like response. Also, note the training error metric (5) is also heightened even though the training stimuli is stable. This indicates an HAMC or AN PTSD chronic anxiety response, which only very slowly reduces over time but does not vanish. This demonstration of a single AN shows how the neuron can be trained to reflect PTSD like behavior, where the HACM or AN is hyper vigilant to a possibility of further erratic training.

As a control, as shown in FIG. 10, a HACM or AN that has not been exposed to erratic training is shown, where it first detect the presence of a consistent stimuli and then stabilizes to nominal training stress. There is no error associated with this training response as can be seen by a flat Chronic Anxiety plot (5).

Summary of Key Features

The present invention relates to an artificial intelligence (AI) learning system using adaptive neural networks (ANN) designated "human affect computer modeling" (HACM) and, more particularly, to AI methods, systems and devices that can recognize, interpret, process, and simulate human reactions and affects such as emotional responses to internal and external sensory stimuli, that provides real-time reinforcement learning modeling that reproduces and predicts human affects and/or reactions. The human affect computer modeling (HACM) can be used singularly or collectively to modeling and predict complex human reactions and affects. Such AI ANN learning systems can optionally comprise a sensory input collection module, a cognitive learning module, and an execution module. The sensory input collection module is operative to receive and process an external sensory input from at least one external environment and at least one internal environment and collect and record data representing the sensory input data as representing velocity and acceleration vectors corresponding to sensory input-specific features from the external sensory input. The cognitive learning module is operative to receive the sensory input data as representing, velocity and acceleration vectors corresponding to sensory input-specific features and identify a current context AI ANN model based an the sensory input-specific features, and, based on the current context AI ANN model and features, learn, construct, or recall a set of action plans and evaluate the set of action plans against any previously known action plans in a related context and, based on the evaluation, selecting the most appropriate action plan given the current context. The execution module is operative to carry out the action plan.

CMAC computes a function $f(x1, \ldots xn)$, where n is the number of input dimensions. The input space is divided up into hyper-rectangles, each of which is associated with a memory cell. The contents of the memory cells are the weights, which are adjusted during training. Usually, more than one quantization of the input space is used, so that any point in an input space is associated with a number of hyper-rectangles, and therefore with a number of memory cells. The output of a CMAC is the algebraic sum of the weights in all the memory cells activated by the input point. A change of value of the input point results in a change in the set of activated hyper-rectangles and therefore a change in the set of memory cells participating in the CMAC output. The CMAC output is therefore stored in a distributed fashion, such that output corresponding to any point in input space is derived from the value stored in a number of memory cells (hence the name associative memory), which provides generalization. The CMAC is an example of an ANN learning module that is a component to the AN. Other ANN learning modules may be substituted instead of the CMAC as required or desired.

The track that the position locator traverses may be one to n dimensions. Subject to the ANN module continuous learning process, the position locator traverses the track subject to different forces of resistance and acceleration (such as gravity or other arbitrary forces, for example). Subject to one or a plurality of real number inputs normalized to be between 0 and 1, the ANN changes the locator position on the track varying velocity (first derivative) and acceleration (second derivative) to achieve the coordinates on the track required to meet the ANN objective function (inputs) in the shortest number of training steps. Affective or reactionary (e.g., emotional) results are recovered by metrics that describe the ease or difficulty associated with the ANN learning the required locator position on the track.

These metrics minimally include 1) the locator position prediction coordinates, 2) locator position velocity, 3) locator position acceleration, 4) the number of steps required for an human affect computer modeling (HACM) module to achieve the desired locator position coordinates on the track, 5) an error metric describing the efficiency of the AN or HACM module moving the locator to the desired position on the track and 6) a return value describing the overall all prediction success rate. The AN or HACM signal outputs reflect the input values exactly so that, for example, the number 0.5 presented to the AN or HACM will be reflected as the output of the AN or HACM once the training period is completed. Consequently, the value of the AN or HACM is not to generalize as is the case with current ANN technologies, it is the AN or HACM Metric outputs that are important. The track of the AN or HACM can have different configurations, for example, instead of a straight track, the track may be curved or have a sinusoidal structure as in a bell curve. Using different track configurations skews the AN or HACM outputs by integrating bias into the HACM learning process. This might be desirable when resistance to change is desired.

The architecture of the present invention provides a unique perspective on the higher-level principles of computation in neural systems, including the interplay of feedforward, feedback and lateral pathways. The present invention offers a unique and explicit formulation of the brain's approach to reusable computing with sharing of neural resources for perception and action. The present invention is a system that employs general-purpose learning mechanisms inspired by biology that provide self-stabilizing representations for the sensory and cognitive processes of the brain to continually learn more about the world without undergoing catastrophic forgetting of concepts already learned from the past. At the same time, the present invention employs learning mechanisms to enable the spatial and motor circuits to continually calibrate the parameters that are needed to control the system in its present form. These complementary learning mechanisms are integrated with adaptively timed neural circuitry and modulated by reinforcement-learning-based neural circuits that model emotion and motivational drives to perform cognitive functions, including reasoning, planning and actions.

What is claimed is:

1. A method for a continuously learning and optimizing artificial intelligence (AI) adaptive neural network (ANN) computer comprising at least one processor specifically designed for: incorporating a Cerebellar Model Articulation Controller (CMAC) neural network for human affect computer modeling (HACM), for predicting, modeling, and simulating human reactions to repeated human stress and/or affect responses to sensory inputs from both external and internal environmental stimuli, the method using learning control and multiple parallel processing neural network pathways, and not using pattern recognition, the AI ANN modeling method comprising:
 (a) executing at least one sensory input collection module on at least one computer system using non-transitory computer readable media operative to collect sensory input data representing at least one set of external environment stimuli inputs and at least one set of internal environmental stimuli inputs from at least one internal environment and at least one external environment;
 (b) executing at least one recording module on at least one computer system using non-transitory computer readable media operative for recording the sensory input data, wherein the sensory input data corresponds to at least two sensory input-specific features;
 (c) executing at least one context module on at least one computer system using non-transitory computer readable media operative to identify and generate at least one current context AI ANN model that processes said sensory input data to provide human reaction model data that is configured for use in a human reaction modeling module that predicts, simulates and models said simulated human reactions to said repeated human stress and/or affect responses to said sensory inputs from said both external and internal environmental stimuli;
 (d) executing at least one vector generating module on at least one computer system using non-transitory computer readable media operative to process the human reaction model data to generate position locator and track data comprising velocity vectors and acceleration vectors that determine at least one position locator on at least one corresponding position locator track traversing at least one dimension, wherein said position locator and track data correspond to said human reaction model data;
 (e) executing at least one human reaction modeling module on at least one computer system using non-transitory computer readable media, the human reaction modeling module operative to use said position locator and track data that is continuously updated to generate human reaction model data that predicts, simulates and/or models said simulated human reactions to said repeated human stress and/or affect responses to said sensory inputs from said both external and internal environmental stimuli;
 (f) executing at least one cognitive learning module on at least one computer system comprising the at least one processor using non-transitory computer readable media operative to:
  (i) compare said predictive reaction/behavior data, corresponding to said predicted, simulated and/or modeled simulated human reactions, with corresponding measured reaction/behavior data from measured or recorded stress and/or affect parameter data of comparative human subjects in similar internal and/or external environments and current contexts; and
  (ii) generate continuously updated predictive reaction/behavior data from said human reaction model data and from said measured reaction/behavior data using the at least one processor,
  wherein said at least one cognitive learning module predicts, simulates and models said simulated human reactions to said repeated human stress and/or affect responses using said position locator and track data and said measured reaction/behavior data; and
 (g) executing at least one optimizing module on at least one computer system using the at least one processor and using non-transitory computer readable media operative to generate optimized predictive reaction/behavior data using first and second derivative optimization of said position locator and track data with learning control and multiple parallel processing neural network pathways to determine optimized sets of said velocity vectors and acceleration vectors corresponding to optimized position locator and track data that provide said optimized predictive reaction/behavior data with the highest correspondence to said measured reaction/behavior data and/or data extrapolated therefrom.

2. An AI ANN computer modeling method of claim 1, wherein the cognitive learning module further comprises:
 an object and event learning system and
 a detection, search, and navigation module,
 where the object and event learning system is operative to use the sensory input data as representing velocity and acceleration vectors corresponding to sensory input-specific features to classify the features as objects and events, and
 where the detection, search, and navigation module is operative to determine if the sensory input data as representing velocity and acceleration vectors corresponding to sensory input-specific features match previously known events and objects, and if they do not match, then the object and event learning system stores the features as new objects and events, and if they do match, then the object and event learning system stores the features as updated features corresponding to known objects and events.

3. An AI ANN computer modeling method of claim 2, wherein the cognitive learning module further comprises a spatial representation module, the spatial representation module operative to establish space and time attributes for the objects and events, operative to transmit the space and time attributes to the novelty detection, search, and navigation module, with the detection, search, and navigation module being operative to use the space and time attributes to construct a spatial map of the external world.

4. An AI ANN computer modeling method of claim 3, wherein the cognitive learning module further comprises an internal valuation module to evaluate a value of the sensory input data as representing velocity and acceleration vectors corresponding to sensory input-specific features and the current context, the internal valuation module being operative to generate a status of internal states of the system and given the current context, associate the sensory input data as representing velocity and acceleration vectors corresponding to sensory input-specific features to the internal states as improving or degrading the internal state.

5. An AI ANN computer modeling method of claim 1, wherein the sensory input collection module includes a sensor for sensing and generating the external sensory inputs, wherein the sensor is selected from a group consisting of a somatic sensor, an auditory sensor, and a visual sensor.

6. An AI ANN computer modeling method of claim 1, wherein the cognitive learning module further comprises an internal valuation module to evaluate a value of the sensory input data as representing velocity and acceleration vectors corresponding to sensory input-specific features and the current context, the internal valuation module being operative to generate a status of internal states of the system and given the current context, associate the sensory input data as representing velocity and acceleration vectors corresponding to sensory input-specific features to the internal states as improving or degrading the internal state.

7. An AI ANN computer modeling method of claim 1, wherein the position locator traverses the track subject to different forces of resistance and acceleration and the ANN changes the locator position on the track by varying velocity as the first derivative and acceleration as the second derivative, using one or a plurality of real number inputs normalized to be between 0 and 1, to achieve the coordinates on the track required to meet the ANN objective function as inputs in the shortest number of training steps; and where affective results are recovered by metrics that describe the ease or difficulty associated with the ANN learning the required locator position on the track.

8. An AI ANN computer modeling method of claim 7, wherein the metrics are selected from at least one of: (a) the locator position prediction coordinates, (b) locator position velocity, (c) locator position acceleration, (d) the number of steps required for the HACM or the AN module to achieve the desired locator position coordinates on the track, (e) an error metric describing the efficiency of the HACM or AN module moving the locator to the desired position on the track, and (f) a return value describing the overall all prediction success rate.

9. An AI ANN computer modeling method of claim 7, wherein a configuration of the track is selected from straight, curved, or sinusoidal, or a combination thereof, and wherein such different track configurations can change the HACM or AN outputs to provide at least one bias into the HACM or AN learning process to modify learning process predictions.

10. An AI ANN computer modeling method of claim 7, wherein the at least one processor implements all of the locator track position locator data, and the metrics.

11. An AI ANN computer modeling method of claim 7, wherein the at least one processor implementation is a dimensionless electrical circuit that processes electrical circuit data as unmapped changes to circuit: voltage, current, resistance, impedance, and/or capacitance; and wherein the dimensionless electrical circuit characteristics are mapped to the velocity and acceleration vectors.

* * * * *